United States Patent
Enqvist

(10) Patent No.: US 9,100,451 B2
(45) Date of Patent: Aug. 4, 2015

(54) MEDIATION SYSTEM AND METHOD FOR PROCESSING EVENT RECORDS

(75) Inventor: Juhana Enqvist, Espoo (FI)

(73) Assignee: Comptel Oyj, Helsinki (FI)

( * ) Notice: Subject to any disclaimer, the term of this patent is extended or adjusted under 35 U.S.C. 154(b) by 0 days.

(21) Appl. No.: 13/285,910

(22) Filed: Oct. 31, 2011

(65) Prior Publication Data

US 2012/0047254 A1    Feb. 23, 2012

Related U.S. Application Data

(63) Continuation of application No. 12/177,620, filed on Jul. 22, 2008, now Pat. No. 8,051,165, which is a continuation of application No. 10/518,553, filed as application No. PCT/FI2004/000254 on Apr. 23, 2004, now Pat. No. 7,610,371.

(30) Foreign Application Priority Data

Apr. 23, 2003 (EP) .................................. 03396036

(51) Int. Cl.
*G06F 15/173* (2006.01)
*H04L 29/08* (2006.01)
*H04L 29/06* (2006.01)
*G06F 15/16* (2006.01)
*G06F 15/76* (2006.01)

(52) U.S. Cl.
CPC ............ *H04L 67/2823* (2013.01); *H04L 29/06* (2013.01); *H04L 69/329* (2013.01)

(58) Field of Classification Search
None
See application file for complete search history.

(56) References Cited

U.S. PATENT DOCUMENTS

| | | |
|---|---|---|
| 4,615,001 A | 9/1986 | Hudgins, Jr. |
| 5,544,154 A | 8/1996 | Glitho |
| 5,768,353 A | 6/1998 | Browne et al. |
| 5,802,142 A | 9/1998 | Browne et al. |
| 6,032,147 A | 2/2000 | Williams et al. |
| 6,122,664 A | 9/2000 | Boukobza et al. |
| 6,332,163 B1 | 12/2001 | Bowman-Amuah |
| 6,405,251 B1 | 6/2002 | Bullard et al. |
| 6,421,676 B1 | 7/2002 | Krishnamurthy et al. |

(Continued)

FOREIGN PATENT DOCUMENTS

| | | |
|---|---|---|
| EP | 0687089 B1 | 5/2003 |
| GB | 2365686 A | 2/2002 |

OTHER PUBLICATIONS

Hwang et al.,"Classification of Pipeline Processors", a subsection in the book: "Computer Architecture and Parallel Processing," McGraw-Hill, 1984.*

*Primary Examiner* — Wen-Tai Lin
(74) *Attorney, Agent, or Firm* — Seppo Laine Oy

(57) ABSTRACT

A mediation method and a mediation system divided into independent node components that process event records independently of the other components of the system. In addition, the system is provided with at least one node manager component that configures the node components and starts them up, when required. Further, the node manager component monitors the functioning of the node components and also stops the node components, if required. Each of the independent node components operates according to its own settings and is thus self-contained and capable of continuing operation even though some of the other components are temporarily inoperative. The system comprises also a system database that manages configuration information and stores audit trail data.

23 Claims, 15 Drawing Sheets

(56) References Cited

U.S. PATENT DOCUMENTS

| | | |
|---|---|---|
| 6,449,618 B1 | 9/2002 | Blott et al. |
| 6,466,542 B1 | 10/2002 | Bottiglieri et al. |
| 6,587,125 B1 | 7/2003 | Paroz |
| 6,754,181 B1 | 6/2004 | Elliott et al. |
| 6,779,030 B1 | 8/2004 | Dungan et al. |
| 6,941,554 B2 * | 9/2005 | Woods et al. .................. 718/102 |
| 2001/0056362 A1 | 12/2001 | Hanagan et al. |
| 2002/0087682 A1 | 7/2002 | Roach |
| 2002/0107754 A1 * | 8/2002 | Stone .............................. 705/26 |
| 2003/0074313 A1 | 4/2003 | McConnell et al. |
| 2003/0133552 A1 | 7/2003 | Pillai et al. |
| 2004/0006608 A1 | 1/2004 | Swarna et al. |

* cited by examiner

Fig. 5

| Comptel Mediation | | | PREFERENCES | ABOUT | LOGOUT |
|---|---|---|---|
| EventLink Administration | | | |

Process Streams > Process Stream Version
[Monitored] Process Stream Version 'Edge Router 1 Monitoring'
Auto-refresh rate 1min 2min 3min No Refresh
Page generated at 13.12.2002 13:38:39

System Overview
Notifications
Process Streams
  ├ Monitored Streams
  └ Monitored Nodes
    └ Your Workspace
Hosts
Reports
Modification History Name: Edge Router 1 Monitoring
Warning/errors: OK
State: Running
Stream description: Stream for processing NetFlow Data from Edge Router 1
Version: 2 View other version
Version description: Stream for processing NetFlow Data from Edge Router 1
Created at: 13.12.2002 09:10:47 by user 'mds'
Last started: 13.12.2002 10:47:35

Operational Statistics
Stream Notifications
Compare versions
Copy as a New Stream
☑ Copy this version to workspace

[ Start ]  [ Stop ]  [ Delete ]

Stream Flowchart

NetFlow> ┐
NetFlow> ┼─→ Formatt> ─→ NM Deliv>
NetFlow> ┘

Nodes

| Name ▶ | Last modified ▶ | State ▶ | Warnings/errors ▶ | Host ▶ |
|---|---|---|---|---|
| Formatting for Network Monitoring | 12.12.2002 20:27:59 | Running | | |
| NM Delivery | 12.12.2002 20:30:04 | Running | OK | Host1 |
| NetFlow Router 1 Primary | 13.12.2002 09:09:17 | Running | OK | Host1 |
| NetFlow Router 1 Secondary | 12.12.2002 20:26:10 | Running | OK | Host1 |
| NetFlow Router 1 Tertiary | 13.12.2002 09:09:55 | Running | OK | Host1 |

MEDIATION SYSTEM AND METHOD FOR PROCESSING EVENT RECORDS

This application is a Continuation of application Ser. No. 12/177,620, filed on Jul. 22, 2008, now U.S. Pat. No. 8,051,165 U.S. application Ser. No. 10/518,553 filed on Dec. 22, 2004, now U.S. Pat. No. 7,610,371 and Application No. 03396036.0 filed in Europe on Apr. 23, 2003, the entire contents of which are hereby incorporated by reference and for which priority is claimed under 35 U.S.C. §119 and 120.

TECHNICAL FIELD

The present invention relates to mediation.

Mediation is a process wherein usage data is collected from telecommunication network and delivered to operator's Operation and Business Support System (OSS/BSS). Mediation software collects usage data from network by interfacing various different network elements. The mediation layer then aggregates, correlates, enriches, validates, formats, and/or rates the data so that it is readable by the target OSS/BSS system and it contains all the required information.

Mediation software hides the complexity of the network from the OSS/BSS system by ensuring that the data received by the OSS/BSS system is similar regardless of the network elements the data is coming from. That is, the OSS/BSS has to communicate only with the mediation software, not with several different kinds of network elements. This is presented in FIG. 1.

The present invention relates also to mediation methods and systems that have been developed in view of the requirements by handling events in new-generation solutions that are especially designed for continuous streaming mediation, which is also called real-time mediation. Mediation software installations in the past have been batch based, this being also the case with the majority of the installations at the time of filing this application. In a batch-based process, event records are collected in larger entities and processed after certain time intervals. Today new cases emerge that require data being collected, processed and delivered to the destination OSS/BSS as soon as the data is available in the network. Real-time mediation offers solution to this problem.

BACKGROUND ART

Traditional event mediation solution contains functionalities like collection of usage data from network elements, aggregation, conversion of data format to unified format, correlation, etc. This all has been ready for years and most likely will be used for years to come.

Traditionally event mediation solution has been evaluated based on following technical criteria: how many network element interfaces it can support, what are the data formats it can read and produce, what is the processing performance of the system, what kind of process management functionalities it provides etc.

Only very rarely event mediation solution has been evaluated from business point view: how much money it can save, how much new revenue it can create, what are the new business models it enables, what kind of value-added information it can produce for operators business processes (e.g. customer care, billing, fraud, statistics).

Actually, business point of view was not very interesting as billing models where simple, stable and source for billing data was always known. Usage information was used also for other than billing purposes but the purpose and content of usage data was well known and well defined.

Shortly said: traditional event mediation is based on well-known sources of usage data, standard data formats, static billing models and relatively simple processing requirements. The main purpose of event mediation has been to collect data from the network, convert it to business support system format and deliver it to selected destinations.

Patent publication U.S. Pat. No. 6,449,618 discloses one real-time event processing system. The principle idea of U.S. Pat. No. 6,449,618 is that the system comprises a real-time analysis engine (RAE), which component provides the real-time feature in the whole system. The publication concentrates on cost control issues of calls made by subscribers. The system presented in the publication is very one vendor oriented and it has a poor flexibility, no modularity and no vendor independence.

Patent publication U.S. Pat. No. 6,405,251 discloses another solution, which concentrates on IP (Internet Protocol) networks and use of correlation and aggregation functions in IP networks.

DISCLOSURE OF INVENTION

It is an object of the present invention to create a reliable mediation system and method with real time processing capability.

According to an aspect of the invention, the mediation system is divided in independent node components that process event records independently of the other components of the system. In addition, the system is provided with at least one node manager component that monitors the functioning of the node components. Each of the independent node components operates according to its own settings and is thus self-contained and capable of continuing operation even though some of the other components are temporarily inoperative. The system comprises audit counters providing counts relating to the processed event records, and the node manager is configured to check whether the counts of the audit counters match, in order to ensure that no event records are lost in the mediation system.

According to another aspect of the invention, there is provided a mediation method wherein event records from the generation layer of events can be collected and processed substantially continuously as a stream. In the method, the processed event records can also be delivered to an element of the operation system layer substantially continuously as a stream.

According to a further aspect of the present invention, there is provided a computer program product for running a mediation system, which computer program product comprises computer program means for controlling the operation of the node manager component(s) and the node components.

Embodiments of the present invention make it possible to construct a reliable mediation system and method with real time processing capability. The inventive concept allows also several useful and advantageous further embodiments, which provide further advantages.

In an embodiment of the invention, wherein the system is divided in self-contained nodes and data buffers have been provided between the nodes, there is no single-point of failure and the system is extremely reliable.

An embodiment of the invention, wherein the node manager starts up new node components, when required, offers scalability to the mediation system.

Invention offers also embodiments of a mediation system, which can be operated continuously once started, because all of the configurations can be made while the system in on production.

There are also embodiments, which allow both batch-type processing and real-time processing of event records.

As is apparent from the above disclosure, the present invention can be applied in a great variety of applications requiring fast and reliable processing of event records.

BRIEF DESCRIPTION OF DRAWINGS

For a more complete understanding of the present invention and the advantages thereof, the invention is now described with the aid of the examples and with reference to the following drawings, in which:

FIG. 5 presents a screenshot of another example of monitoring view of user interface according to an embodiment of the invention.

DEFINITIONS

Figure 1:
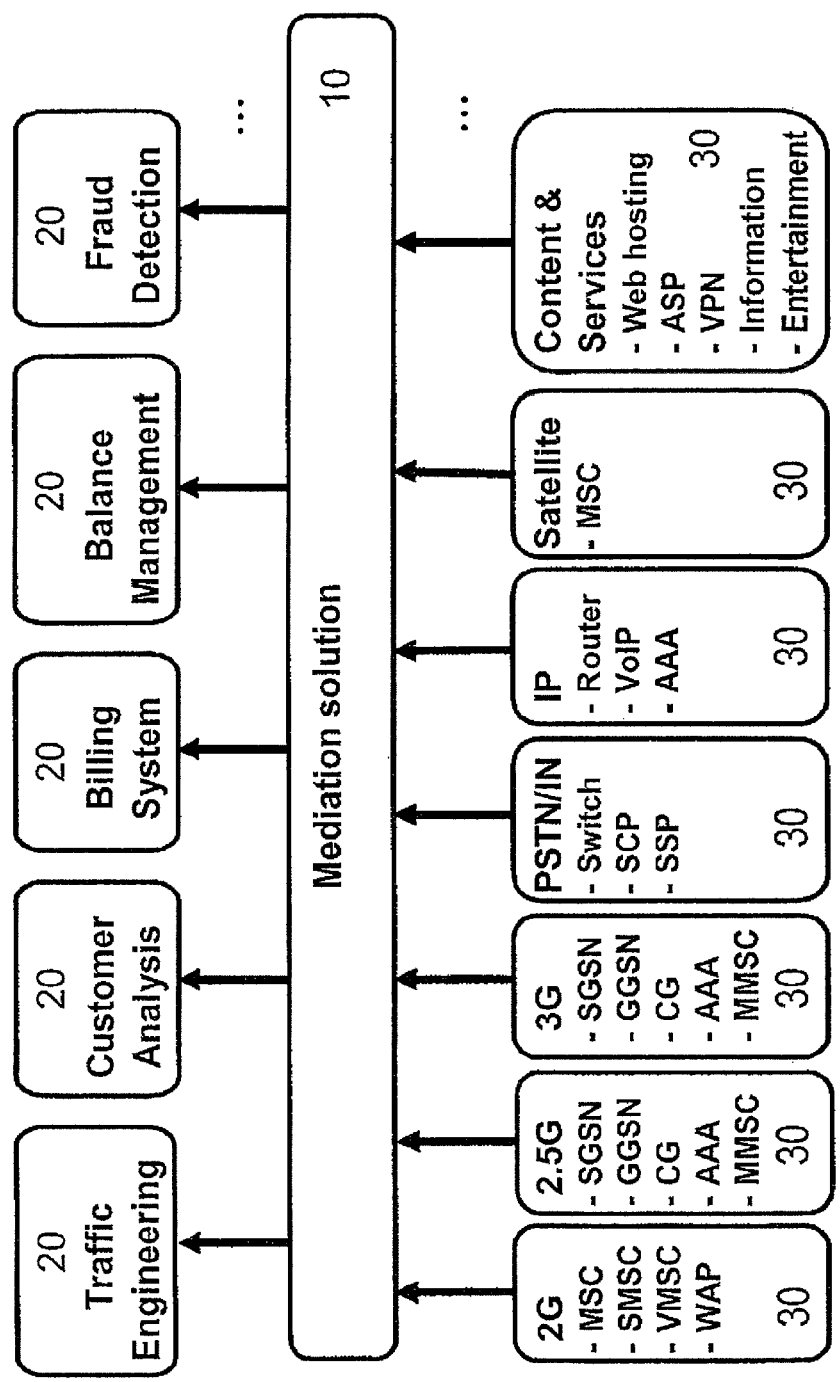
FIG. 1 presents a block diagram of a mediation layer between the network elements and operations and business support systems.

Event: Event is a transaction occurring in a telecommunications network. Events are typically caused by actions taken by a subscriber while using telecommunication services. Evens may also be based on actions taken by the telecommunication network or an apparatus connected to it, e.g. while executing telecommunications services. Some events may be even generated automatically while executing service programs and performing other functions for providing services to the customers.

Event Record: Event Record is a record that indicates that an event has occurred. That is, an even record provides information that a subscriber has used a telecommunications service. Event record contains also detailed information about the event. Hence, an event record may contain information on the usage, e.g. if the used telecommunication service is a phone call, the event record may indicate how long the call lasted, or if the service is downloading a file from an FTP server, the event record may contain information about the size of the transferred data block.

Real time: Real time refers to passing event record through mediation system in streaming format. That is, as soon as a certain node in mediation stream has processed (e.g. enriched) the record, it is passed to the next node. Pass-through time in a real-time system may be, e.g. from about 1 millisecond to 10 seconds. In some embodiments, events may pass through the system even faster. Sometimes, depending on the embodiment and application, the term real-time may also comprise pass-through times longer that stated above. In general, a real-time service is a service that does not include considerable delays such that a user of the service considers acts being taken and services provided essentially at the moment the services are ordered (i.e. events supplied to the mediation system).

BEST MODE FOR CARRYING OUT THE INVENTION

Embodiment of the invention described below provides a new-generation mediation solution that has been especially designed for real-time handling of event record streams. Usage data flows through the mediation solution as individual event records, which are passed to billing, traffic engineering, network planning, balance management, fraud detection and/or other OSS/BSS systems. The OSS/BSS systems can be sure that their operations are based on accurate real-time information.

The billing system receives event records from the mediation solution in an instantly billable form. The mediation solution allows various charging options; billing can be based for example on volume, content value, QoS (Quality of Service) or time, or any combination of these. The mediation solution enables charging of content and MMS services (Multimedia Messaging Service) by being capable of transmitting usage data for example from MMSC (Multimedia Messaging Service Center), content proxies and application servers. It enables also usage-based billing of VPNs (Virtual Private Network) and Internet connections, allowing for example charging on the basis of QoS and bandwidth.

Real-time information allows OSS/BSS systems to see in real-time what individual subscribers are doing and how the network is being used. This information can be analysed to find more competitive tariff structures and reduce customer churn. It can also help in depicting end-user characteristics and planning how to better serve individual customers. Functions such as balance management for customers' cost and credit control and fraud detection can use the information for controlling service usage.

The mediation solution according to the embodiment has been designed to interface with any network and to serve any OSS/BSS system. It can be used for both packet and circuit switched networks by all types of operators including 2G, 2.5G, 3G, IP, fixed-line and satellite network operators as well as service operators. It provides numerous off-the-shelf standard and proprietary interfaces to different OSS/BSS systems. The mediation solution can handle any type of records generated by different types of network elements. Furthermore, the embodiment can handle and process these records despite differences in their structure.

If required, the presented embodiment can also handle batch-like file-based processing. Further, it is possible to schedule the executions of batch-based streams. The system can collect audit data per batch process. Batch processing could be emulated by triggering the first Node in the stream to start at configured times. All the other Nodes operate internally as always-on.

Features and Benefits of an Embodiment

In the following, arguments are presented for the profitability of a solution according to an embodiment of the invention, together with presentation of some of the novel features of the embodiment.

Vendor Independence—Focus on Performance and Cost-Efficiency

With complex network and business support systems (in a multiswitch/system type of environment), it is beneficial to be able to make cost and performance comparisons between different players. The embodiment enables a vendor independent choice. Operators and service providers need to consider the performance and cost-efficiency. Due to these points, the mediation solution can be easily updated in a highly complex, multi-vendor environment. Adding new network element and OSS/BSS interfaces is fast, which allows rapid and cost-efficient launching of new services.

Ability to Create a Best-of-Breed, Convertible Customer Care and Billing System

A mediation device according to the embodiment is truly independent from any network element and billing system vendor. The mediation solution is capable of collecting data from any network (3G, 2.5G, 2G, IP, fixed line or satellite) or service platform and of delivering it to any Operations or Business Support System—regardless of operators' or service providers' network or OSS/BSS vendor.

High Performance

In a typical configuration of the system, the event records are processed in a pipeline architecture, wherein all mediation functions are executed simultaneously for different records of the event record flow. This, combined with the core event record processing executed in programs written in a low-level programming language, ensures very high records per second throughput.

Scalability and Distributability

A mediation solution according to the embodiment is extendable from handling a small number of event records up to billions of events per day. Scalability can be reached simply by multiplying mediation processes (e.g. analysis, aggregation, rating) within the host. If the processing power of a single host is not sufficient, the mediation processes can be distributed to one or more additional hosts, in which case the system automatically takes care of transferring the event record data to the host it is next processed in. The hosts are typically UNIX, LINUX or suchlike efficient computers. Hosts from different system vendors can be mixed without restrictions.

Modular Software—Quick and Reliable Time-to-Market

The solution according to the embodiment consists of tested and proven modules. Operator's particular business solutions can be introduced in a quick and reliable manner. The mediation solution is a packaged software product that can be implemented in a considerably shorter time than tailor-made solutions. In addition to quicker implementation, an off-the-shelf product allows easier and more cost-efficient maintenance and usage.

Easier Management and Monitoring of Processing with Large Networks

Prior art batch-based processing is very difficult to monitor with large networks. The solution according to the embodiment collects and stores all events and other data related to the mediation processes into a single, centralised storage, and allows a possibility to send them to e.g. a third party network management system. This allows easy, centralised management and monitoring of the system independently of the size of the network.

Reliability

The mediation solution according to the embodiment has a straightforward architecture, which is based on well-proven technologies. The functional structure is based on totally new elements for processing events in an inventive environment. The processes can function independently of each other and the managing system. All data is buffered in any kind of error and system overload situations.

The system is designed so that there is no single point of failure, e.g. a common process for handling the event record transferring from one node to another. This means that as long as the host server is running, and there is free space in the host's file system, the event record processing is not interrupted.

Real-Time Network Usage Information

A real-time mediation solution provides operators' and service providers' OSS/BSS systems with instant information about subscribers' current network usage. Real-time information is vital for many business operations such as network planning, traffic engineering, balance management and fraud detection. Further, having a real-time mediation solution offers various benefits to operators. Real-time usage information helps OSS/BSS systems to make operator business more profitable and increase customer satisfaction. It allows for example:

More accurate and timely billing cycles by allowing immediate creation of subscriber bills.

Balance management and fraud detection by offering real-time information about subscribers' network behaviour.

Capacity optimisation by giving instant information about network usage.

Verification of the quality of the network by giving the possibility for network monitoring.

In some cases, a real-time interface to the network is simply a necessity as an increasing number of network vendors are shifting to support real-time network elements. Some IP network elements require a real-time collection interface, since file-based collection from them is not always reasonable.

Flexible charging.

With the mediation solution according to the embodiment, charging can be based on content value, QoS, volume, bandwidth or time, or any combination of these. The mediation solution enables billing of MMS and IP services by being capable of transmitting usage data for example from MMSC, content proxies, application servers and probes. The mediation solution can handle any type of records generated by different network elements independently of used record type. This so-called free record type handling is recognized and handled by configuration of the mediation solution described later in this document.

Configurability

Users can define freely which processes to include in a mediation process chain. There can be several process chains (streams) functioning concurrently. Each process is fully configurable, making it possible to define accurate rules for usage data handling. The order of the mediation processes is fully configurable and same processes can be multiplied if needed.

The configuration of the process chains can be done without disturbing the ongoing processing, and the user can decide when to activate the changes into the configuration. The version control of the configurations allows returning to an earlier working configuration version in case of problems.

Easy Operation

In an embodiment of the invention having a web-based user interface, all monitoring, configuration and maintenance of the mediation solution can be done through the intuitive, web-based user interface. The mediation solution user interface offers web-based revenue assurance reports, which enable easy detection of gaps in usage information, as well as verification of the integrity of information flow.

24/7 Availability and Reliability

The mediation solution according to the embodiment is a system with online configuration that is available 24/7. It is ready to receive event records from the network any time. All mediation processes of the mediation solution, such as data analysis and correlation, run independently of each other. Even if one of the processes is affected for example by a network error, all the other processes continue running as before. The mediation processes of the mediation solution run independently of the process management system. They can function temporarily without system critical resources, such as the system database. All data is automatically buffered in any kind of error situation to ensure that no event records are lost.

Functionality of an Embodiment

Mediation consists of different processes like collection, validation, enrichment, aggregation, correlation, rating, conversion and delivery. The varied functionality allows OSS/BSS systems to receive usage data just as they want it.

Some of the main functions of a mediation solution according to an embodiment of the invention are described below. Each of these functions is configurable.

Collection

The mediation solution according to the embodiment is capable of interfacing with any network—e.g. 3G, 2.5G, 2G, IP, fixed line or satellite—or content and services platform— or any combination of presented network technologies. It collects the event records from the network as continuous real-time stream or as files.

Validation and Analysis

When receiving event records from the network, the mediation solution checks them for duplicates and verifies their sequence. By doing this, it ensures that the numerous event records stream into the system in correct order and that none of them is missing or delayed or tries to enter the system for the second time.

After collection, the mediation solution carefully examines and analyses the contents of the event records. It checks that all values included in the event record fields are applicable and in a correct format. It can join fields and insert additional values to them when necessary.

Enrichment

The mediation solution according to the embodiment is able to enrich event records by completing them with information from external sources. It can, for example, fetch the information on which customer category a specified service user belongs to, and add this information to the event record. Marking of customer category helps other processes such as billing.

Aggregation and Correlation

In aggregation, the mediation solution according to the embodiment merges partial event records produced by a single service usage and coming from the same network source. Aggregation thus allows the OSS/BSS systems to receive only one billable record from each service usage.

Correlation involves combining event records also, but the records to be correlated come from different sources. A GPRS session, for example, produces S-CDRs (Call Detail Record) in SGSN and G-CDRs in GGSN that the mediation solution is able to correlate into one output record.

The records to be correlated may come at the same time from access network and content platform, which is the case in a content usage session. The mediation solution then completes the event records from content platform with the user identification fetched from access network. The correlated records contain all the information needed for content charging: who the user was, what services he used and for how long, as well as the value of the services.

Rating

The rating functionality of the mediation solution according to the embodiment allows pricing of event records in the mediation system. Flexible rating criteria and various pricing models can be used as rating bases. Also subscriber specific rating is possible. The rated event records can be sent directly from the mediation solution to balance management and other applications without any intervention from billing system.

Storing

All records of the mediation solution according to the embodiment can be stored into a long-term event database. The event records can be stored into the database during different mediation processes, for example before and after aggregation, correlation or rating.

The long-term storage capability allows to view and fetch records from the database at all times and check how different mediation processes have modified them. The stored event data gives valuable information about subscribers' network usage in the long run.

Formatting

Before delivering the fully processed event records to the OSS/BSS systems, the mediation solution according to the embodiment converts them to formats compatible with these systems. The mediation solution is able to convert the records either to a standard format or to operators' proprietary formats. Due to conversion, an OSS/BSS system receives all usage information from the network in a uniform, predefined form. It should be noticed that the formatting of event records may be done also in any point or points through the processing chain (stream) of the mediation process.

Delivery

The mediation solution according to the embodiment is able to simultaneously interface with multiple different OSS/BSS systems. Even if it performs all its collection and other processes in real-time, it is able to deliver the processed records to the OSS/BSS systems either through a configured real-time protocol or a file interface.

Architecture of a Mediation Solution According to an Embodiment

The keywords of the mediation solution architecture are simplicity and straightforwardness. The modular design of the solution according to an embodiment of the invention enables real-time and distributable processes, reliable operation and high performance.

The mediation solution according to the embodiment consists of mediation processes, managers controlling the processes, system database and web-based user interface. Mediation processes such as collection, analysis, correlation and conversion are linked together to construct processing streams. Streams are fully customisable and there can be multiple streams simultaneously active.

Figure 3:
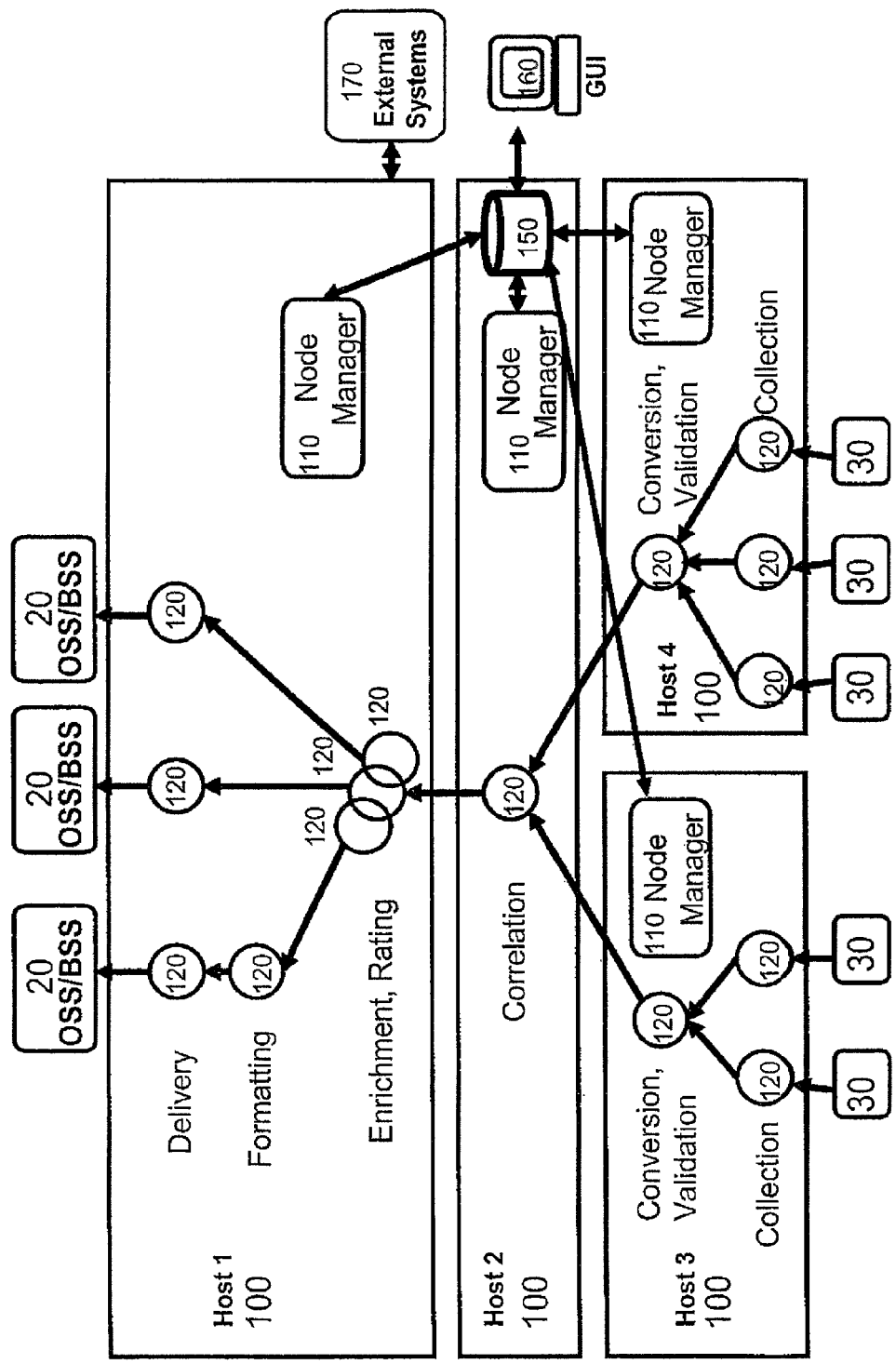
FIG. 3 presents a block diagram of a framework according to an embodiment of the invention.

According to the embodiment, all processes are controlled by process managers, which start up, monitor, stop and configure them when so instructed. This is presented in FIG. 3. Managers give configurations to the processes during startup. Once started, the processes can function independently from the manager, also in case the manager is temporarily unavailable.

Unlike the batch processing methods, which process the files in turns, the new architecture is an "always on" architecture, wherein, in the best case, all the processes are doing work simultaneously (pipeline architecture).

A single functionality, like processing call data from all network elements and forwarding it to the billing system, is usually done in a single processing stream, unlike in the old mediation solution in which there is one batch processing method for each network element.

Node (Mediation Process)

Nodes 120 are functional components specialised in different mediation processes, such as collection, aggregation, validation, correlation and formatting, or a combination of these. Nodes are linked together to form processing streams for event record handling. Each stream 200 is fully configurable through the web user interface of the mediation solution according to the embodiment.

Nodes 120 run independently of each other. This means that even if one of them is temporarily unavailable, the other nodes continue as before. This, in addition to their independence from the manager 110, adds to the reliability of the system. Also, any data that cannot be transferred from one node to another, due to for example a network failure, is buffered.

Figure 2:
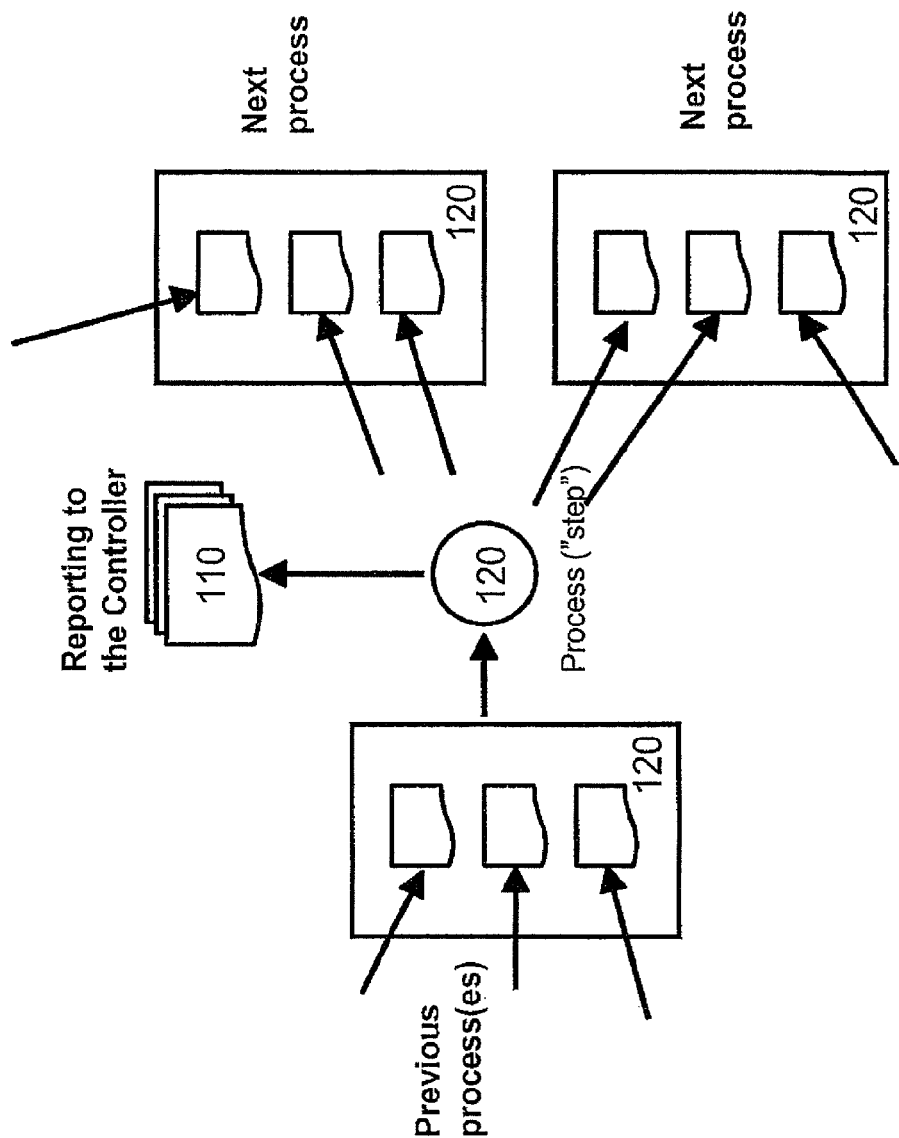
FIG. 2 presents a block diagram of a single function in a framework according to an embodiment of the invention.

FIG. 2 presents the main idea of a node according to an embodiment of the invention.

Some of the properties of a node are:
  Totally independent of the controlling process, i.e. if the controller dies, the event record processing will continue.
  Always on: after the controller has started the process, it will not end until the controller stops it
  Scans event records for processing from the source(s) designated by the controller.
  Writes the output records to the destination(s) designated by the controller.
  Writes revenue assurance etc. reporting data at regular intervals to a place designated by the controller
  Sends heartbeat signal to the controller indicating that the node is alive.
  Special nodes, like a collector node, can have following special attributes and features:
    Timing of the sending of records for further processing: time-based intervals for streaming collectors for forwarding data in larger record blocks for improved throughput.
    Scheduling file-based collection or delivery process—the node itself handles the scheduling.

Node Manager (Process Controller)

While nodes take care of the actual processing of the event records, Node Manager 110 makes sure they function in a controlled way. Node Manager 110 configures the nodes 120 into correct processing order, starts them up, monitors and stops them when so ordered. Before starting up a new node 120, Node Manager 110 retrieves its configuration information from the system database 150 and configures the node 120. Since the node 120 itself contains the configuration, it is able to function properly even if Node Manager 110 and system database 150 are temporarily unavailable.

Some of the properties and features of the Node Manager 110 are:
  Self-contained process
  For multi-host distribution, an identical Node Manager 110 process is installed and operated in each host. There is no master process for controlling Node Managers 110.
  The Node Managers 110 know their responsibilities from reading the database 150; they do not know anything of each other and do not need to communicate between themselves.
  Node Manager 110 starts and stops the processing streams 200 and nodes 120 according to the orders read from the database 150.
  It monitors the nodes 120 and restarts them in case of failure or lockup.
  It reads the revenue assurance etc. reporting data files and saves it into the database 150.
  It automatically inserts file transferring processes when the processing crosses host boundaries.
  It can optionally send any alarms with SNMP protocol to a configured network management system in case of problems in processing.

System Database

System database 150 stores node configuration, audit trail information as well as status information of nodes 120, streams 200 and Node Managers 110. Also orders for Node Managers 110 are stored within the system database 150.

Typically, the database 150 is viewed, updated and maintained with the user interface 160 or the command line system tools, but external systems 170 can also connect to the mediation solution and access the system database 150.

User Interface

The web-based user interface 160 of the solution is used for managing, configuring and monitoring of the system. The whole distributed system can be viewed and managed through this single-point interface.
  Configuration of processing streams and nodes, configuration version management
  Startup and shutdown of streams 200 and nodes 120
  Monitoring of the Node Managers 110 and active streams 200 and nodes 120
  Revenue Assurance according to the stored reporting
  Alarm management User Functions in an Embodiment of the Invention The web user interface of the mediation solution according to an embodiment of the invention has been designed to make all monitoring and configuration operations fast and effortless. Below are presented some of its main user functions.

Monitoring

Figure 4:
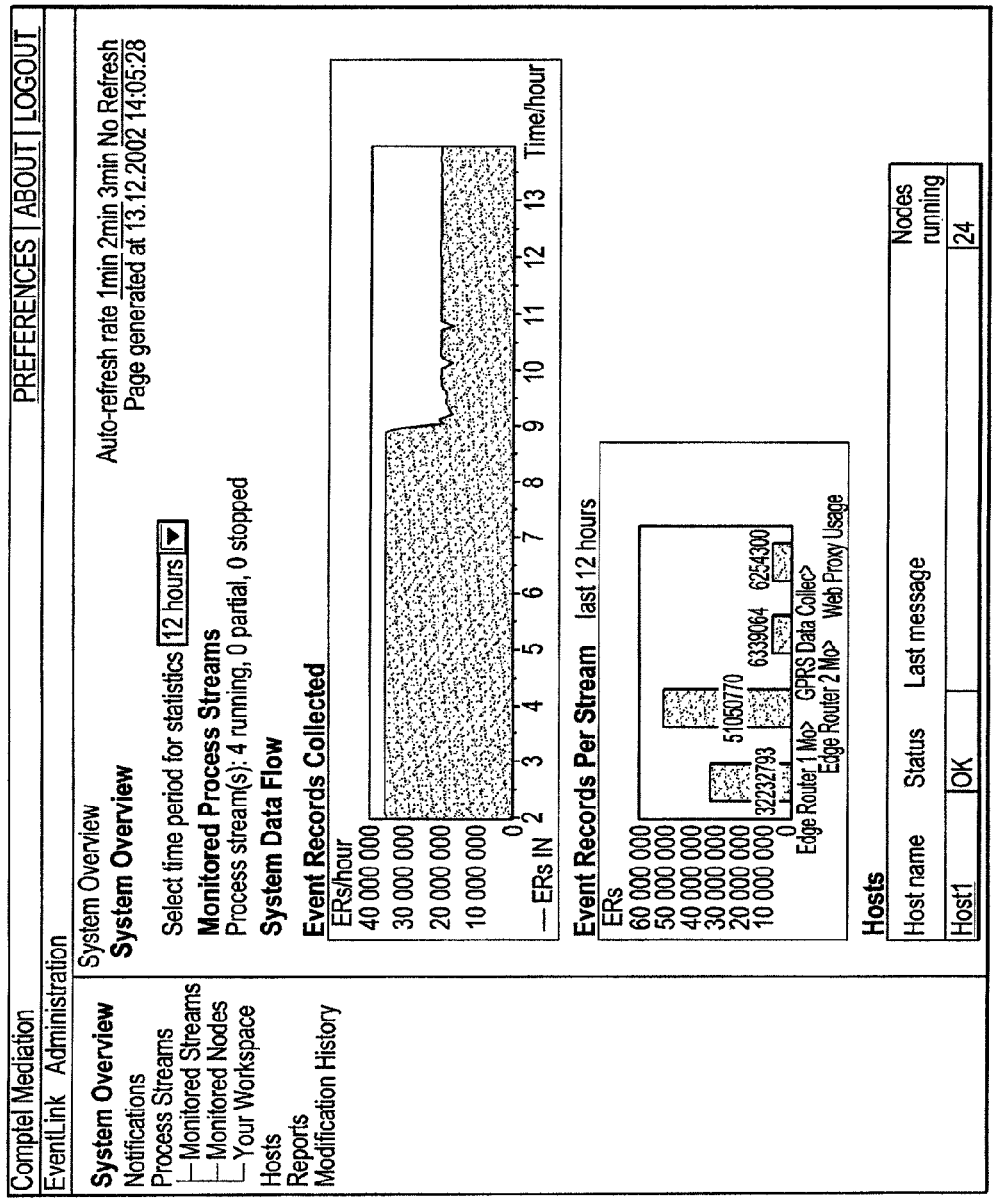
FIG. 4 presents a screenshot of an example of monitoring view of user interface according to an embodiment of the invention.

FIG. 4 presents the main page of the user interface 160, which shows all the important information related to the event record streams 200 and mediation processes 200. The mediation process streams, their statuses and possible warnings, the numbers of collected event records and host-related information can be viewed.

Monitoring is easy when all system and event information can be seen at a glance on the same web page. Possible gaps in event data can be detected fast and integrity of the event record flow can be easily verified.

Configuration

The main page contains links to different processes and parts of the system that user may want to view in more detail. For example, user can click a link that takes him/her to view a particular mediation process stream. From there, he/she can take the process stream to a workspace and modify it or create a new version of it. A screenshot of configuring page is presented in FIG. 5.

All process stream changes are versioned. This allows a user to backtrack a possible faulty configuration back to an earlier, correctly working one, which can be used in production until the problems with the new configuration are fixed.

Online configuration of the mediation solution enables new versions of process streams to be taken into use seamlessly. The online configuration does not affect to other system processes, only to those particularly pointed system processes during configuration and activation of a process stream.

Audit Trail

The mediation solution according to the embodiment offers user a full audit trail of all user operations. It allows user to see who has done what and when. User can see for example who has acknowledged and corrected a network error and when this has been done.

Reporting

Figure 6:
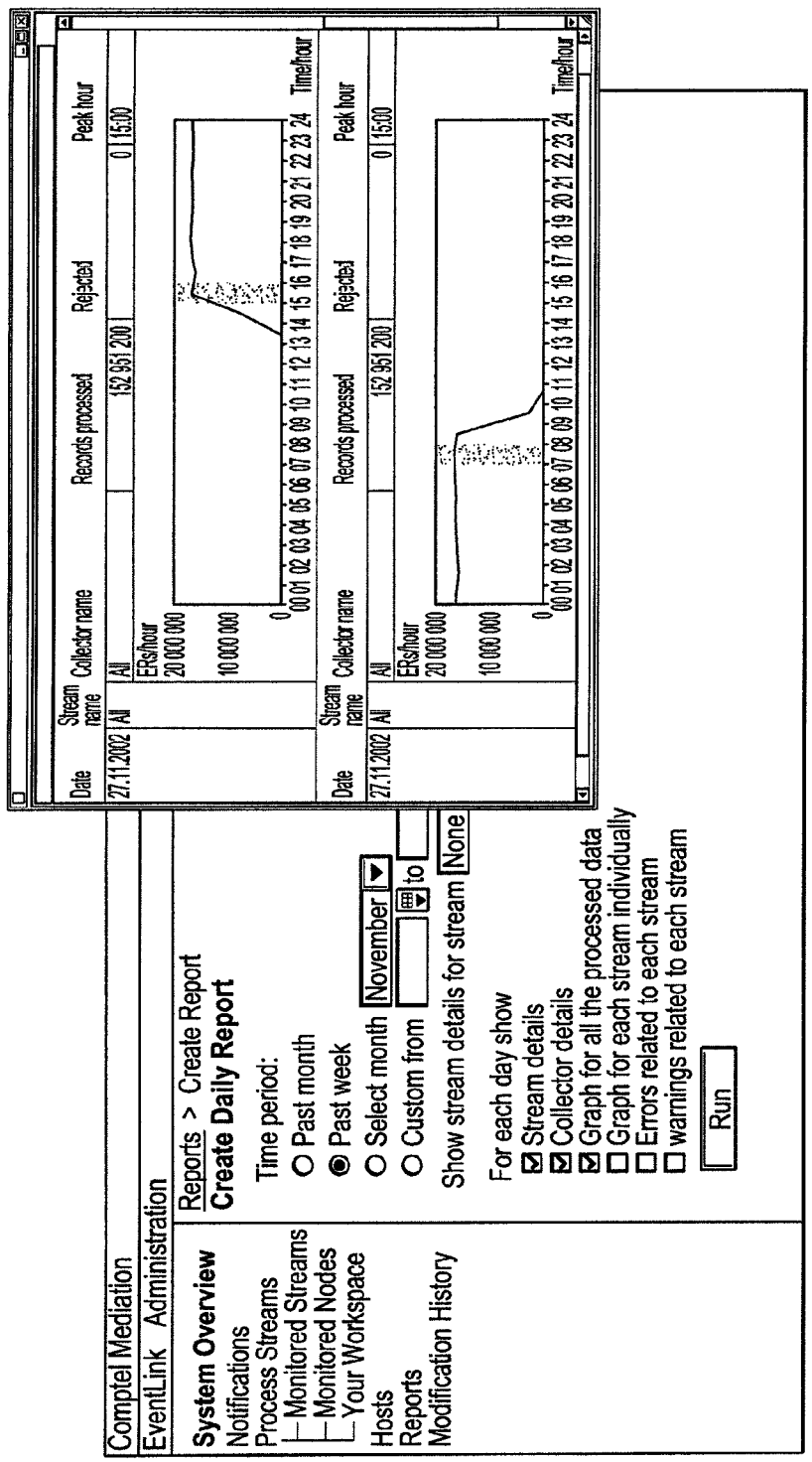
FIG. 6 presents a screenshot of another example of monitoring view of user interface according to an embodiment of the invention.

The mediation solution according to the embodiment provides various reports and graphs related to event record streams and system functions. User can view for example the numbers of processed and rejected event records per network element and the peak hours of event record streams. This is presented in FIG. 6.

An Example of Using an Embodiment of the Invention

Figure 7:
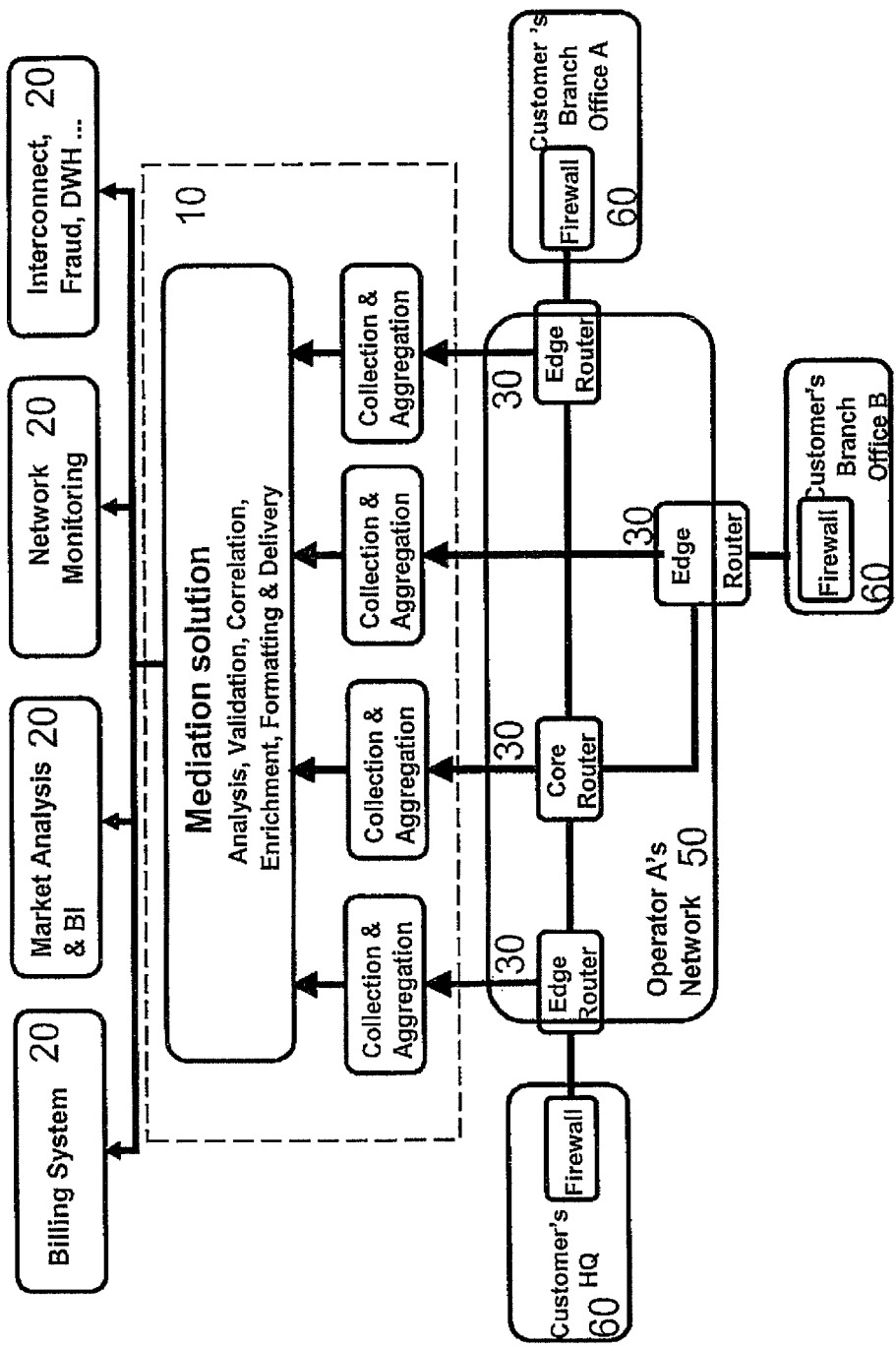
FIG. 7 presents a block diagram of an example of framework according to an embodiment of the invention.

FIG. 7 presents the following example.

Starting point: Operator A 50 has a customer 60 that holds a video conferencing session between headquarters and two branch offices, which are located in different cities. The customer has built its network infrastructure so that it has IP-VPN using MPLS technology in its backbone network. The customer's firewall is connected to the operator A's edge network via an MPLS-enabled edge router. The traffic between the customer's firewall and corporate A's edge network is pure IP.

The mediation solution 10 has been distributed so that it has real-time collection and aggregation functions near operator A's edge router 30 and a centralised processing module at operator A's data centre. Distribution is required since the router produces lots of information, which is minimised on site before sending it to the data centre over network.

The customer's IP-VPN service offers three Classes-of-Service (CoS) for different applications with different QoS (Quality of Service) requirements: Platinum, Gold and Silver. Video conferencing has the highest QoS requirements; thus Platinum service is used.

Operation: The mediation solution 10 collects usage information in a real-time stream from operator A's edge router 30. The information collected is flow information, from which the mediation solution 10 fetches different parameters such as user, application, router interface, CoS, used bandwidth and in-net/off-net traffic separation.

The mediation solution according to the embodiment enriches the flow information to include time and date information and more detailed information for example about customer and QoS. The enriched information enables several usage-based billing models. In this case, the price is based on
 the customer profile (discount to a valued customer),
 CoS (Platinum service),
 used bandwidth (only used in Platinum service),
 in-net traffic (cheaper in your own network) and
 time of day (cheaper outside office hours).

In addition to the edge routers, the mediation solution retrieves network utilisation information from core routers. Operator A can use this information for network management purposes.

The mediation solution according to the embodiment sends one aggregated, enriched and formatted IP Data Record (IPDR) to operator A's billing system. This record contains only the information needed for billing. A more detailed record is sent to the OSS/BSS systems 20 for storing more detailed information about service usage. This information is used for many purposes like SLA (Service Level Agreement) management, network planning, monitoring and fraud detection.

Overview of an Initial Architecture According to an Embodiment of the Invention

Figure 8:
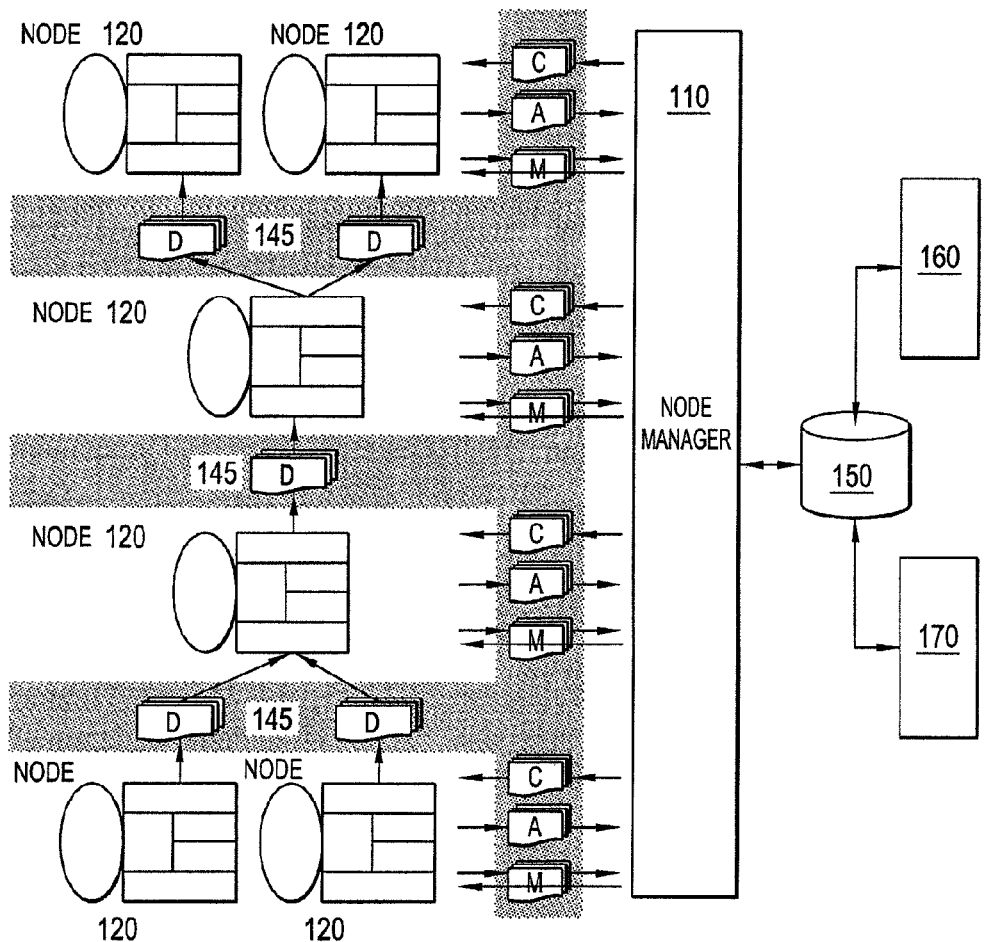
FIG. 8 presents a block diagram of architecture according to an embodiment of the invention.
Figure 9:
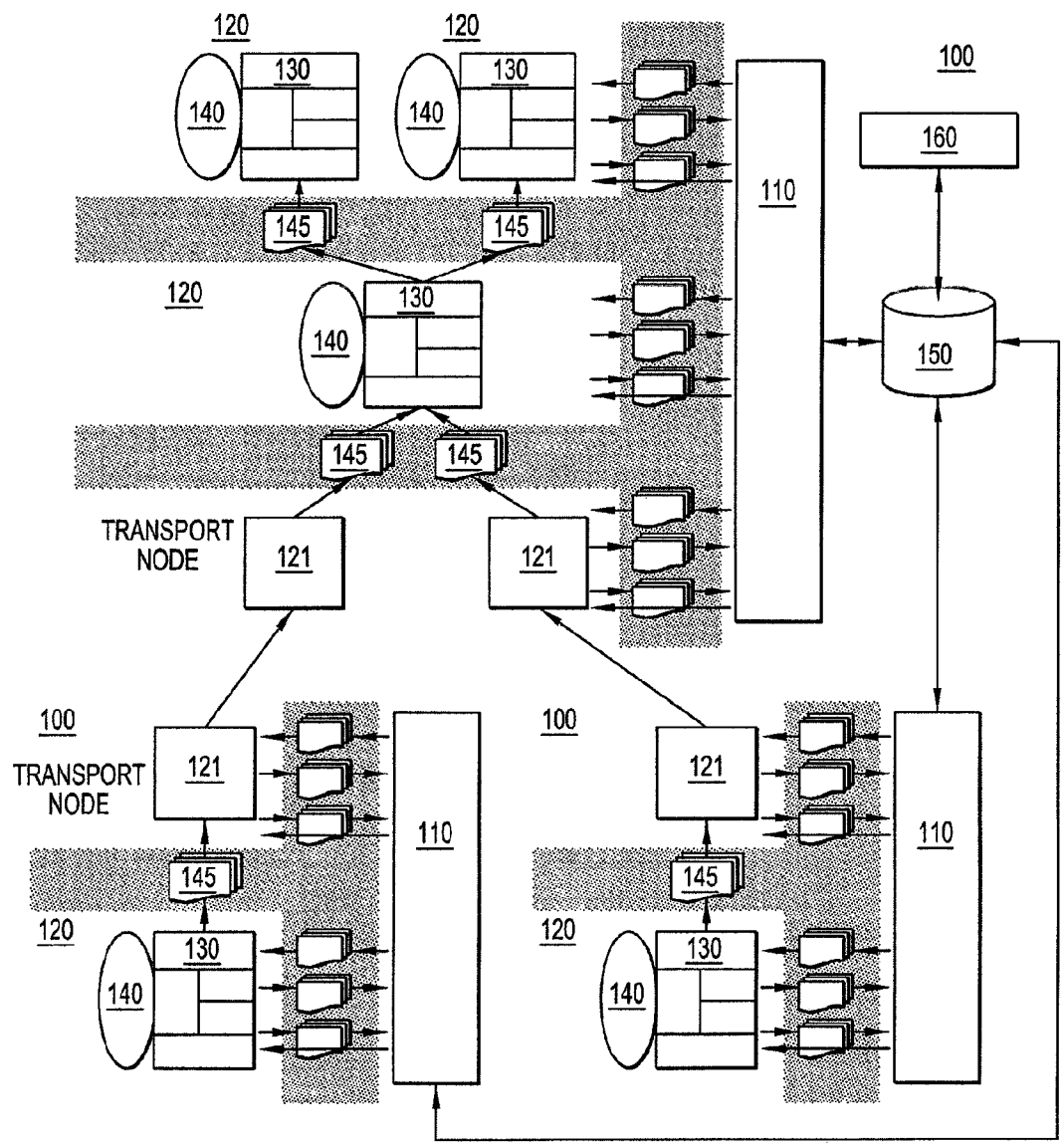
FIG. 9 presents a block diagram of another architecture according to an embodiment of the invention.

The initial architecture of the mediation solution according to an embodiment is described in FIGS. 8 and 9. The detailed requirements for the components are evaluated later in this document.

The presented embodiment consists of the following separate parts:

1. System Database 150 and User Interface 160 for centralised management of the system.
2. Node Manager 110 which controls chained data processing applications 140 within a host 100
3. Node Base 130 which gives the basic functionality for various data processing applications 140
4. Applications 140, which contain customized business logic for processing event records.

FIG. 8 illustrates the presented embodiment, the real-time processing architecture on high-level. The architecture consists of Node Managers 110 that control a number of Nodes 120 residing within the same physical host 100. The Node Manager(s) 110 have an interface to a System Database 150 that is used for storing various configuration and audit trail information. The User Interface also interfaces with the System Database. The solution uses file-based interfaces for transferring usage data between the Nodes 120 and for communication between the Nodes 120 and the Node Manager 110.

FIG. 9 illustrates the presented embodiment, the real-time processing architecture of several hosts on high level. In addition to FIG. 8, there are presented the Transport Nodes 121, which handle the transmission between the different hosts.

The following high-level interfaces are identified within the system:
D=data transmission and buffering mechanism 145
C=configuration interface between Node Manager (process management system) and Nodes (processes) 146
A=audit data interface between Nodes and Node Manager for revenue assurance purposes 147
M=management interface between Nodes and Node Manager 148
API=application interfaces for integration and system maintenance 170
DB=configuration, system monitoring and audit trail database 150
UI=user interface 160

Figure 10:
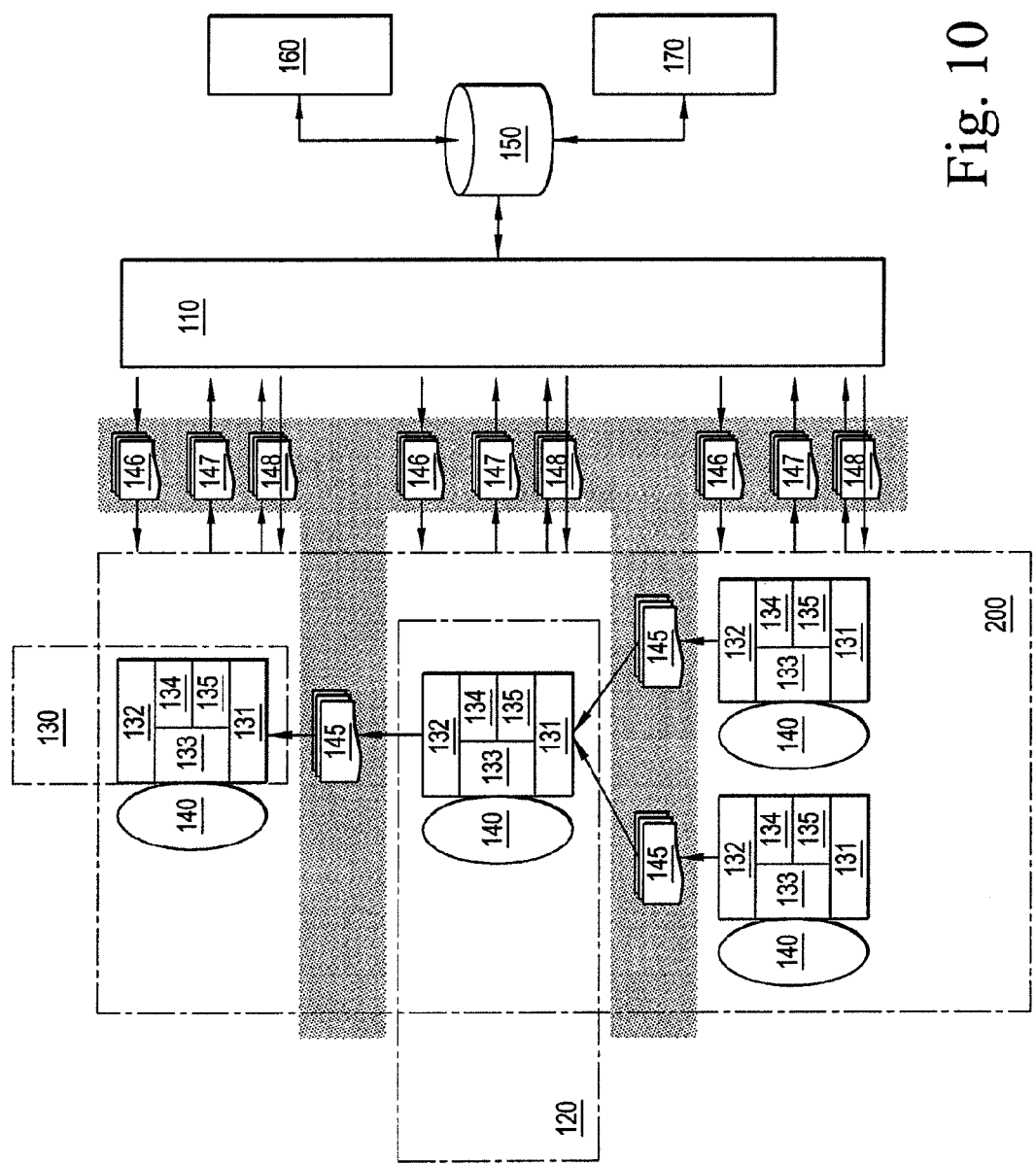
FIG. 10 presents a block diagram of the main components of architecture according to an embodiment of the invention.
Figure 11:
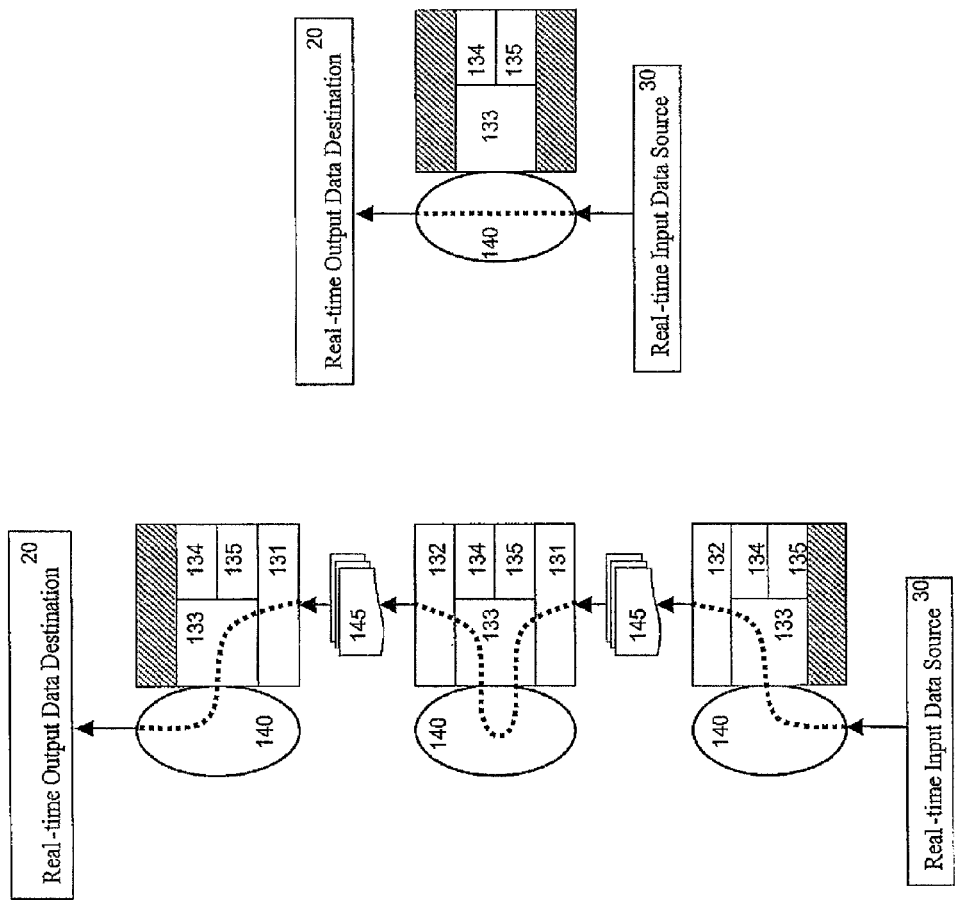
FIG. 11 presents a flow diagram of a process according to an embodiment of the invention.

When the system is distributed to several hosts 100, each host has its own Node Manager 110 that controls the Nodes 120 within the host. Transport Nodes 121 take care of transferring data from one host to another. FIG. 10 illustrates the distribution of the system. For clarification, the hosts 100 can be situated in anywhere in the world. For instance, an operator may have several networks in different countries or even continents. In these cases it is recommended to set at least one host to each country or continent. This minimizes the flow traffic over intercontinental transmission lines and makes the system efficient and more reliable.

Each Node 120 has standard functionality that provides automated data transmission mechanism between the Nodes and processing information logging mechanism between the Node and the Node Manager. The actual usage data processing logic is implemented by different applications 140 that reside in the Nodes. These applications 140 are isolated from internal data transmission mechanism and internal data formats enabling easier application development. Applications 140 are drawn as ovals in the FIGS. 8-12 presented. The system provides a standard interface through which the applications communicate with the processing framework.

Terminology and Component Descriptions in the Embodiment

The initial terminology and the components of the mediation solution according to the embodiment are described in this chapter. FIG. 10 illustrates the architecture of the mediation solution in more detail. Each component that needs to be named has its own number. The table 1 presents a name for each component and gives a short description of the component.

TABLE 1

| # | Name | Description |
|---|------|-------------|
| 120 | Node | Node is an independent processing module that consists of two parts: 'Node Application' and 'Node Base'. This component is always running when first started. |
| 130 | Node Base | Node Base provides the basic standard functionality for the Node. It handles the internal usage data transmission mechanism between the Nodes and encodes the internal usage data. Node Base provides an interface to the Node Application for accessing the usage data and collecting customised audit information. It also communicates with the Node Manager for exchanging management, audit and configuration information. |
| 131 | Node Input | Node Input is responsible for reading the data from the internal input data sources, parsing it and passing the data to Node Application interface. Node Input uses Data Transmission Interface that defines the internal data format and data transmission mechanism. |
| 132 | Node Output | Node Output is responsible for reading the data from the Node Application Interface and encoding and writing it to Data Transmission Interface. Node Output uses Data Transmission Interface that defines the internal data format and data transmission mechanism. |
| 133 | Node API | Node API provides the Node Application the access to the usage data. It 'hides' to internal data transmission interface from the Node Application. Node API includes functionality for providing the usage data to and receiving it from the Node Application. It is also used for retrieving customised audit information from the Node Application and for providing configuration parameters to it. |
| 134 | Node Configuration | Node Configuration is responsible for reading the configuration data from the Configuration Interface and for initialising the Node according to given configuration parameters. Node Configuration also passes Node Application specific parameters to the Node API. Node Configuration uses Configuration Interface that defines the configuration data format and transmission mechanism. |
| 135 | Node Audit | Node Audit is responsible for writing various audit data to the Audit Interface. Node Audit defines content for audit interface. Node Audit uses Audit Interface that defines the default audit data format and transmission mechanism. Node Audit uses also Management Interface that defines monitored data format and transmission mechanism. This is used for example for indicating the status of the Node. |
| 140 | Node Application | Node Application is responsible for altering the usage data in required manner. This includes processing functions like altering the data, filtering the data, aggregating and correlating the data. Node Applications are easy to implement for any data processing purpose. The Node Base enables development of Node Applications for example in C, C++, Java or Perl.Node Application communicates with the Node Base for retrieving the usage data from the internal data transmission mechanism or for sending usage data forward via the internal data transmission mechanism. Node Application also reports customised audit information about the usage data processing to the Node Base. If the Node is the first or the last Node in a Processing Chain the Node Application is also responsible for retrieving or sending the usage data from or to the required external interface. This includes encoding and decoding the usage data. |

TABLE 1-continued

| # | Name | Description |
|---|---|---|
| 145 | Data Transmission Interface | Defines the usage data format and data transmission mechanism between the Nodes. |
| 146 | Configuration Interface | Defines the configuration data format and transmission mechanism from the Node Manager to the Nodes. |
| 147 | Audit Interface | Defines the audit data format and transmission mechanism from the Nodes to the Node Manager. |
| 148 | Management Interface | Defines the Management Interface between the Nodes and the Node Manager. |
| 110 | Node Manager | Node Manager is responsible for managing Nodes in the same host than it is running in. This includes starting up, shutting down, monitoring and configuring Nodes and collecting audit information from them. |
| 150 | System Database | System Database contains configuration information and audit trail data for all the Nodes and Node Managers in the system. Information in the System Database is also used for the User Interface. |
| 160 | User Interface | User Interface is used for configuring, managing and monitoring the system. |
| 170 | External Systems Interfaces | Interface that makes it possible to integrate different applications to the system: for example revenue assurance reporting tools etc. may consists of several different interfaces |
| 200 | Processing Chain (stream) | Processing Chain consists of several Nodes. Typically a Processing Chain has Nodes for collection, processing and delivery. The number of Nodes is not limited. The number of Processing Chains in the system is not limited. |

Nodes 120 can be further categorised according to their functionality. The functionality depends on the Node Application 140 and the Node's position in the Processing Chain 200. The first Node 120 in a Processing Chain 200 can be called a Collector Node and the last Node a Delivery Node. In these cases the data parsing and formatting functionality needs to be performed by the application 140 itself and the standard functionality provided by the Node Base 130 is not used. The flow of usage data and the standard components that become obsolete are shown in the FIG. 11. In this picture it is assumed that the data source 30 and destination 20 both operate with some real-time protocol, i.e. they are using a socket connection for sending and receiving data.

Figure 12:
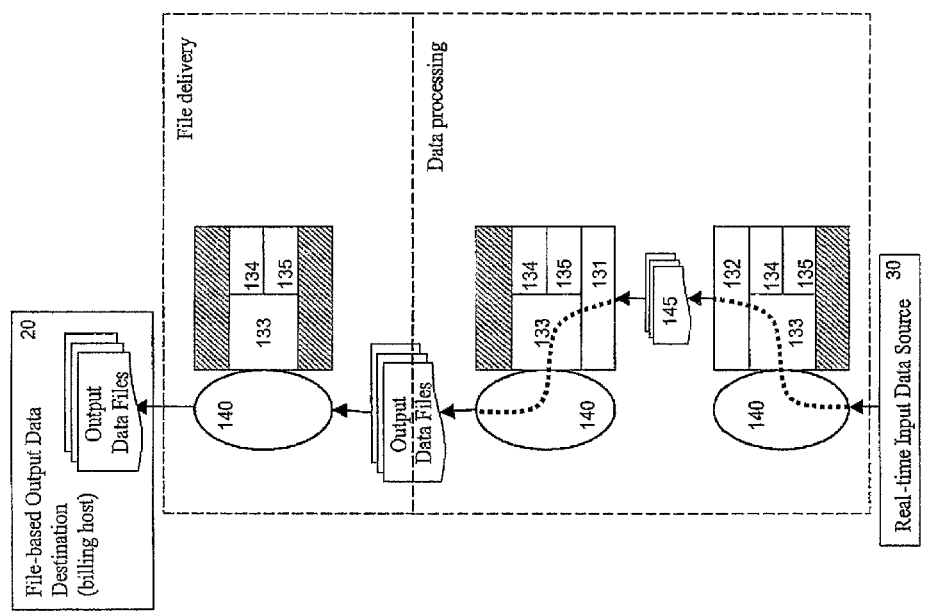
FIG. 12 presents a flow diagram of another process according to an embodiment of the invention.

If the output data destination 20 requires the use of file-based interface, the applications take care of formatting and writing the data in the output files. In case like this, it might be necessary to separate the output file generation and the delivery of the output files to separate Nodes 120. Then the Delivery Node only transfers the output data files to the destination via required protocol, for example ftp and does not parse the data at all. This is illustrated in FIG. 12.

Summary of the interfaces that are used between the system components:

User Interface 160—System Database 150

User Interface 160 retrieves information from the System Database 150 tables using table queries. System configurations and audit and status information are queried. User Interface also updates tables in the System Database upon user's request. The updates consist of system configuration changes and management commands.

Node Manager(s) 110—System Database 150

Node Manager(s) 110 retrieve system configuration information from the System Database 150. Node Managers 110 also downloads the configurations upon system start-up and re-configuration. Node Managers 110 also retrieve system software from the System Database 150. Node Manager(s) 110 push the system audit and status information to the System Database 150. This interface uses table updates and queries.

Node Manager 110—Node(s) 120

A Node Manager 110 interfaces with the Nodes 120 residing in the same host 100.

Node Manager 110 initialises a Node 120 by installing the Node software with the Node configuration 146. Node Manager starts and shuts down 148 the Nodes. Shutdown is executed by sending a signal. There are at least two different ways of shutting a Node down; immediate shutdown and shutdown after internal record storage flush.

Node Manager retrieves audit and status information 147 by collecting audit files generated by a Node and evaluating the heartbeat file updated by the Node periodically.

Node 120—Node 120

Nodes do not interface directly. The internal data transmission within a Processing Chain 200 passes data from one Node to another. The data is passed in files. The files are self-descriptive: a file contains the data and the description of the data. A Node 120 knows where to write it's output data. The location of the output data is an input data source for the next Node(s) in chain. These locations are determined by the system configuration and are configured for the Nodes by the Node Manager(s) 110

When two consecutive Nodes 120 in a Processing Chain 200 are located in the separate hosts 100, the internal data transmission is executed by special Transport Nodes 121 that are initialised, configured and started by the Node Managers 110 automatically. The actual transmission protocol may be for example ftp or if secure data transmission is needed scp.

Overview of a Mediation Solution According to an Embodiment of the Invention

The functional features of the mediation solution according to an embodiment are listed below.

The mediation solution consists of a User Interface 160, System Database 150, Node Manager(s) 110 and Nodes(s) 120. System Database 150 is used for storing the system configurations and various statistics reported by the system. The Nodes 120 perform the actual data processing and provide information about the processing via various counters. A Node Manager 110 manages all the Nodes 120 within a single host 100. Node Managers 110 collect the data processing information from the Nodes 120 and store it to the System Database 150. The User Interface 160 retrieves this information from the System Database 150 and generates various audit trail reports about the data processing.

Nodes 120 are grouped into Process Streams 200. Each Node 120 belongs to a one Stream 200 and a Stream consists of at least one Node. Data is passed in files from a Node to other. Each Node within a Process Stream constantly checks its input directory for new data files. When a file is detected, it is immediately processed. Files are processed one by one. A Node may produce multiple output files. If a Node is a Collector Node receiving data through a real-time interface (socket), it will write the data to the output file(s) that are closed periodically. Upon closing new data file(s) are opened.

Therefore, the system will include the following components:
  User Interface 160
  System Database 150
  Node Manager(s) 110
  Node(s) 120
  External Systems Interface(s) 170

User Interface 160 is used for monitoring, maintaining and configuring the system. User Interface interfaces with the System Database 150.

System Database 150 includes the system configuration information, system audit data and possibly the system software for the Nodes 120.

Node Managers 110 are installed to each host 100 and they will manage the Nodes 120 within a host 100. Node Manager interfaces with the System Database 150. Node Manager 110 collects configuration information (and possibly the Node software) from the System Database, configures 146 the Nodes and starts them up. Node Manager(s) also collect audit and status information 147 from the Nodes and delivers the information to the System Database. Node Managers also send Node status information to the Network Management System (NMS).

Nodes 120 will process the usage data. A Node consists of basic functionality in Node Base 130 used for transferring data between the Nodes in system internal format and Node Application 140 that performs the actual usage data processing.

External Systems Interface(s) 170 are connections to the System Database 150, which can be used for integrating external system such as management systems or reporting tools with the product. External Systems Interface is a general name for the interface and it may be divided to several external application specific interfaces. Some of the identified External Systems Interfaces and possible applications attached to them are described below:
  Management Interface offers a monitoring and management interface for Network Management Systems (NMS) via SNMP. NMS could request status and statistical and other audit information that is then retrieved from the System Database. NMS could also manage the system: start-up, restart and shutdown Nodes or Processing Chains and change configurations
  Reporting Interface provides an interface to audit and status information in the System Database. A Reporting Tool can then provide various reports based on this data.

System Operation and Data Processing Principles in an Embodiment

The system configuration is stored and maintained in the System Database 150. There is one Node Manager 110 installed in each host 100 and started as an independent process. The configurations are changed from the User Interface 160. The system is managed from the User Interface.

Upon the system start-up, Node Managers 110 read the Processing Chain configurations from the system database 150 and starts up the Processing Chains. A Processing Chain 200 consists of Nodes. Each of the system components executes independently once started. The Processing Chains 200 process the data until they are shut down. The Node Manager 110 shuts down the Processing Chains 200 or Nodes 120 upon user's request.

The usage data flows between the Nodes 120 in internal data files. Each Node checks its' input data sources constantly for new data files. When a new data file is detected, it is immediately processed and delivered to the output destinations. Usage data is processed file by file. When an input file is processed and the possible corresponding output data file is created, the input file is removed. This way no data is lost if a Node 120 crashes during data processing. Each Node locks the input file it is reading. This way no other Node can erroneously read the same file.

At a crash recovery the Node will start writing to the beginning of the existing temporary file. This ensures that no duplicate records are generated and no temporary files are left permanently on disk.

If a Processing Chain 200 is distributed to several hosts 100, the system will automatically take care of usage data transmission between hosts. This is done by an application 121 that is divided into the sender and receiver processes, which reside in the separate hosts.

There is a mechanism for discarding usage data that is identified to be invalid by the usage data processing logic. It is possible to feed the invalid usage data back to the data processing chain. The invalid data is formatted similarly as it arrived to the Node that discarded it.

System Monitoring According to an Embodiment

The Node Manager 110 constantly monitors the status of the nodes, and:
  If a Node has crashed the Node Manager will start it up again
  If a Node has frozen the Node Manager will kill and restart it Restarting is tried a few times. If the first restart does not succeed, the current block of input records for the Node is discarded as faulty data to a storage directory, and the processing continues from the next record block in the queue.

Node Managers can send SNMP traps to inform Network Management System about the statuses of the Nodes and other problems such as low disk space, database and network connection trouble. The status information is also stored to the System Database from where the information is collected and shown in the User Interface.

System Audit Information According to an Embodiment

Usually mediation comprises many tasks such as aggregation, correlation and filtering. Sometimes records are rejected, omitted and in some cases even new records are created. This leads to a situation where the number of records input to the mediation solution does not equal the records output from the mediation solution. This requires that mediation solution offers transparency so that the users of the system may monitor the number of incoming and outgoing records and confirm that all records are properly processed by the mediation solution.

The nodes report to node manager 110 by providing certain audit counters. These audit counters include important counters, that is, those counters that every node application must report to the node manager after certain periods. These important counters are listed in table 2.

Important counters are used to calculate that there is no mismatch in the counters and thus ensuring providing evidence to the user of the system that mediation solution hasn't lost records.

Example

Data through a Node or a Processing Chain: Output records=input records+records residing within the Nodes at start+split records+duplicated records+generated records−filtered records−discarded records−records aggregated/correlated−records residing in the Nodes at the end. "At start" and "at end" refer to at the end and start of a certain configured time period, for example 5 minutes that is under investigation. Every node has a certain reporting period and in the end of the period all the counters are reported by the node 120 to the node manager 110. For example, as a default a Node reports audit information per input data file when the input data file is processed. If the input interface is a real-time interface (the interface is from e.g. a network element and not from a preceding node), the audit information is reported when the output data files are closed. If more than one output data files are generated, all the files are closed at the same time. If both of the interfaces are real-time interfaces, then the audit information is reported periodically based on time. If there is no "standard" input interface, i.e. the Node flushes its internal data storages or Node reprocesses rejected data; the audit information is reported when the corresponding output data files are closed.

Each Node 120 has one input source and zero or more output destinations per reporting period. The audit information can be divided into three categories (types): information about the input interface, information about the Node's internal functionality and information about the output interfaces. The audit information is provided by these categories. If a Node has more than one output interface, the audit information should be provided for each output interface separately. For one reporting period each Node reports the input file (if used) and the output interface information per produced output file (if any produced).

Figure 13:
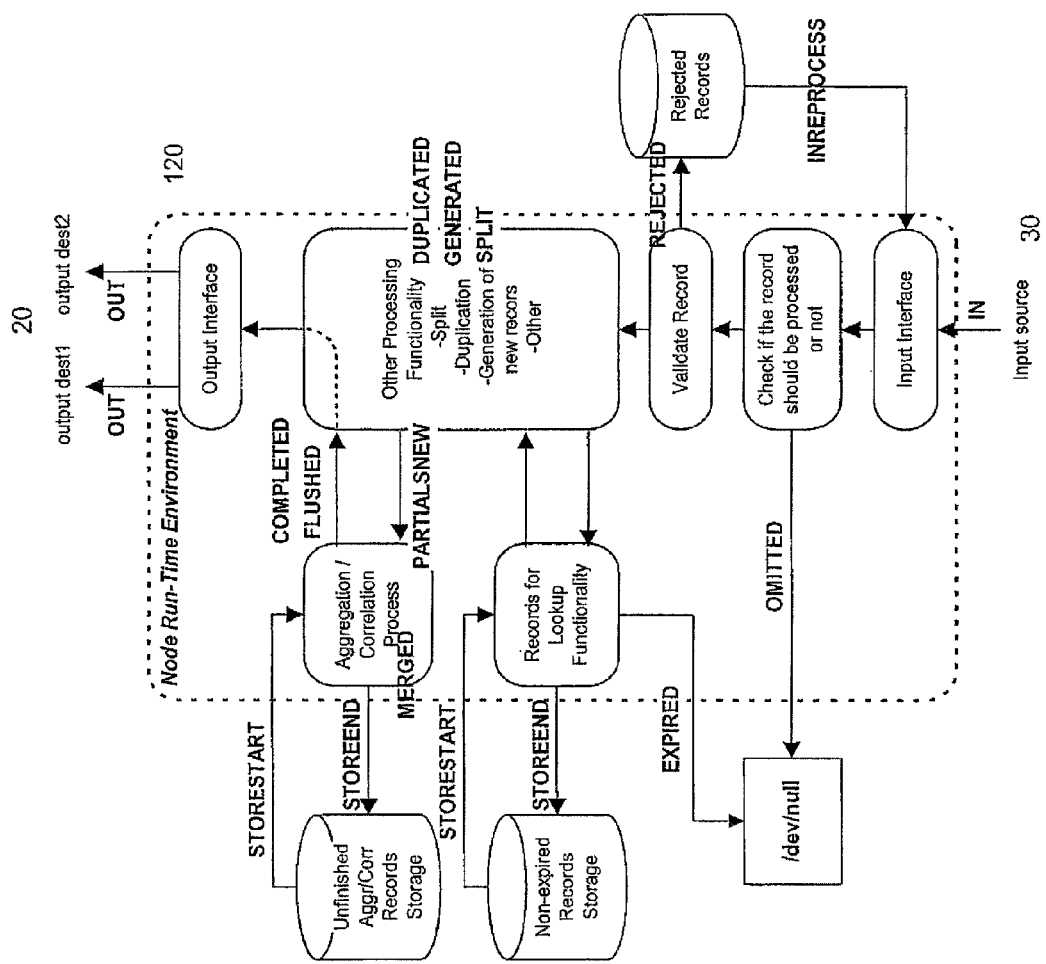
FIG. 13 presents a block diagram of audit counters and node functionality according to an embodiment of the invention.

The usage of the counters related to Node functionality is described in the FIG. 13.

The important counters listed in Table 2 can be further divided to sub counters, e.g. counter "rejected" may consist of lower level counters "rejected for reason x" and "rejected for reason y". In addition to important counters, nodes can provide other counters containing information that are customer specific. These counters are defined in customer specific logic and according to this information it is possible to build also customized reports. These customised reports can provide information for example about different kind of statistics of processed records, graphs showing the trend of rejected records or durations etc.

TABLE 2

| Counter | Explanation | Type |
| --- | --- | --- |
| Records in | The number of records received from input source(s). | Input interface |
| In reprocess | The number of previously rejected records received for reprocessing. | Input interface |
| Stored | The number of records that are "held within the node". Meaning, records that will be aggregated or correlated with other records that have not yet been received. In calculations defining that there are no mismatches in counter values, it is actually the change of this value within a time period that is interesting. | Internal |

TABLE 2-continued

| Counter | Explanation | Type |
| --- | --- | --- |
| Omitted | The number of Filtered records. These records are filtered according to the customised rules. | Internal |
| Rejected | The number of records that are rejected for a reason or another. | Internal |
| Expired | The number of records that have expired. E.g. a correlated record that has been "stored" has later expired according to a time stamp. | Internal |
| Split | The number of records split, that is, one record has been split to two or more. Criteria for splitting are defined by customised rules. | Internal |
| Duplicated | The number of records duplicate, that is, one record has been sent further as two or more copies. | Internal |
| Generated | The number of new generated records. Customised rules may define that in some cases new records are generated. A common case would be e.g. writing header and trailer records. | Internal |
| New partials | This is related to Stored and in reprocess counters. New partials are the records that are sent to correlation or aggregation process. | Internal |
| Merged | The number of records merged. | Internal |
| Completed | The number of records that have been output because aggregation or correlation process has been completed. | Internal |
| Flushed | The number of records that were flushed out from correlation or aggregation process. | Internal |
| Out | The number of records output. | Output interface |

Nodes 120 residing at the edges of a Process Stream 200, i.e. Collector and Delivery Nodes read and/or write data to and from external systems without using the internal transmission mechanism. This interface may be file-based where records are transferred within data files or socket-based where the records are transferred through some real-time protocol.

For socket-based interface the number of bytes transferred (in and out) and the number of bytes rejected due invalid format and parsing errors should be reported. For file-based interface the names of the files transferred (in and out), their sizes (in and out) and the number of bytes rejected due invalid format and parsing errors should be reported. These additional counters are listed in table 3.

TABLE 3

| Audit Counter | Explanation | Type |
| --- | --- | --- |
| BytesIn | The number of bytes in through a socket interface. | Input interface |
| FileIn | The input file name and the size in bytes. | Input interface |
| BytesRejected | The number of bytes rejected due invalid format | Input interface |
| BytesOut | The number of bytes out through a socket interface | Output interface |
| FileOut | The output file name and the size in bytes. | Input interface |

Node Applications According to an Embodiment of the Invention

Different types of Node Applications 140 that are responsible of the usage data processing are listed in this chapter. Some of the Node Applications are common for most of the product installations and some are customer specific.

Data Collection & Data Parsing (Input Interfaces)

Collector Nodes collect usage data either as files or through a real-time protocol. There are generic Collectors and Network Element specific Collectors.

Collector Nodes parse the usage data collected. It is be possible to define rules how data is parsed in the application configuration. A typical Collector converts the usage data into internal format for the next Node in the Processing Chain. It is also possible that the Collector Node is the only Node in the Processing Chain: in this case the Node collects, parses, processes and delivers the usage data. An example of this is a Node that acts as a protocol converter.

Data Processing

The standard data processing functionality includes:
Data validation and filtering
Data manipulation and splitting
Data duplication
Data generation (for example header/trailer records)
Lookup mechanism for receiving information from external sources
Data Aggregation/Correlation
Record duplicate/sequence checking When the Node Application operates based on the internal data format, no data parsing and formatting functionality is needed. The Node Application receives data record by record from the internal data transmission mechanism.

Correlation may use external record storage for intermediate records. The correlation function is able to read records from multiple sources.

Data Delivery and Data Encoding (Output Interfaces)

Delivery Nodes deliver usage data either as files or through a real-time protocol record per record. There are generic Delivery Nodes and Business Support System specific Delivery Nodes.

The Delivery Nodes encode the data to the format the interfaced OSS/BSS requires. For file-based delivery, file-naming functionality is available. In case of file/batch type delivery, it is possible to schedule the delivery application.

Figure 14:
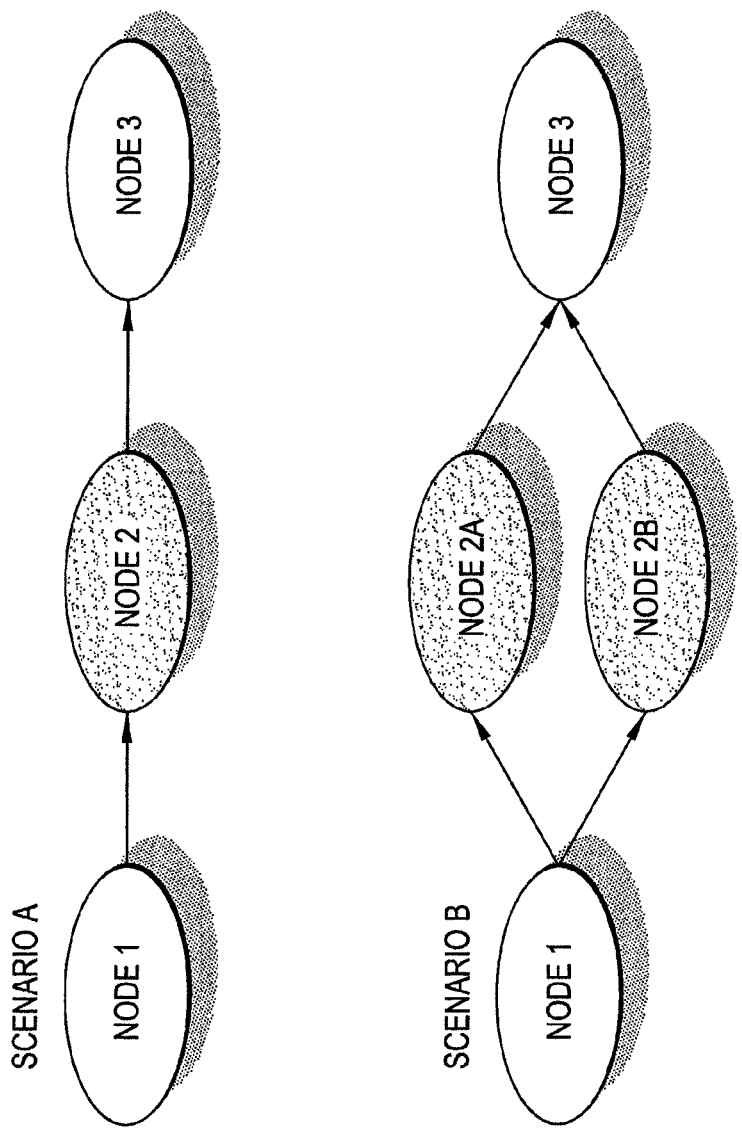
FIG. 14 presents a block diagram of multiplying a mediation process according to an embodiment of the invention.

Increasing Throughput by Multiplying Mediation Processes According to an Embodiment of the Invention In case of insufficient processing capacity of a mediation function or functions within a processing stream, an embodiment starts up an identical copy of the node in question to scale up the processing capacity of the system. FIG. 14 shows an example, in which the node 2 has insufficient performance in scenario A. In scenario B, the node 2 has been duplicated to run in nodes 2a and 2b, which are running in parallel and sharing workload between them. Because the embodiment uses buffers between the consecutive nodes, the parallel nodes 2a and 2b can use the same buffers from which to read event records and to which to write. In such an arrangement, the preceding node 1 need not be modified when duplication node 2 as node 1 can continue writing its output to the one and same buffer. In a corresponding manner, node 3 can read from the same buffer regardless of the number of nodes 2 that write to the buffer.

Figure 15:
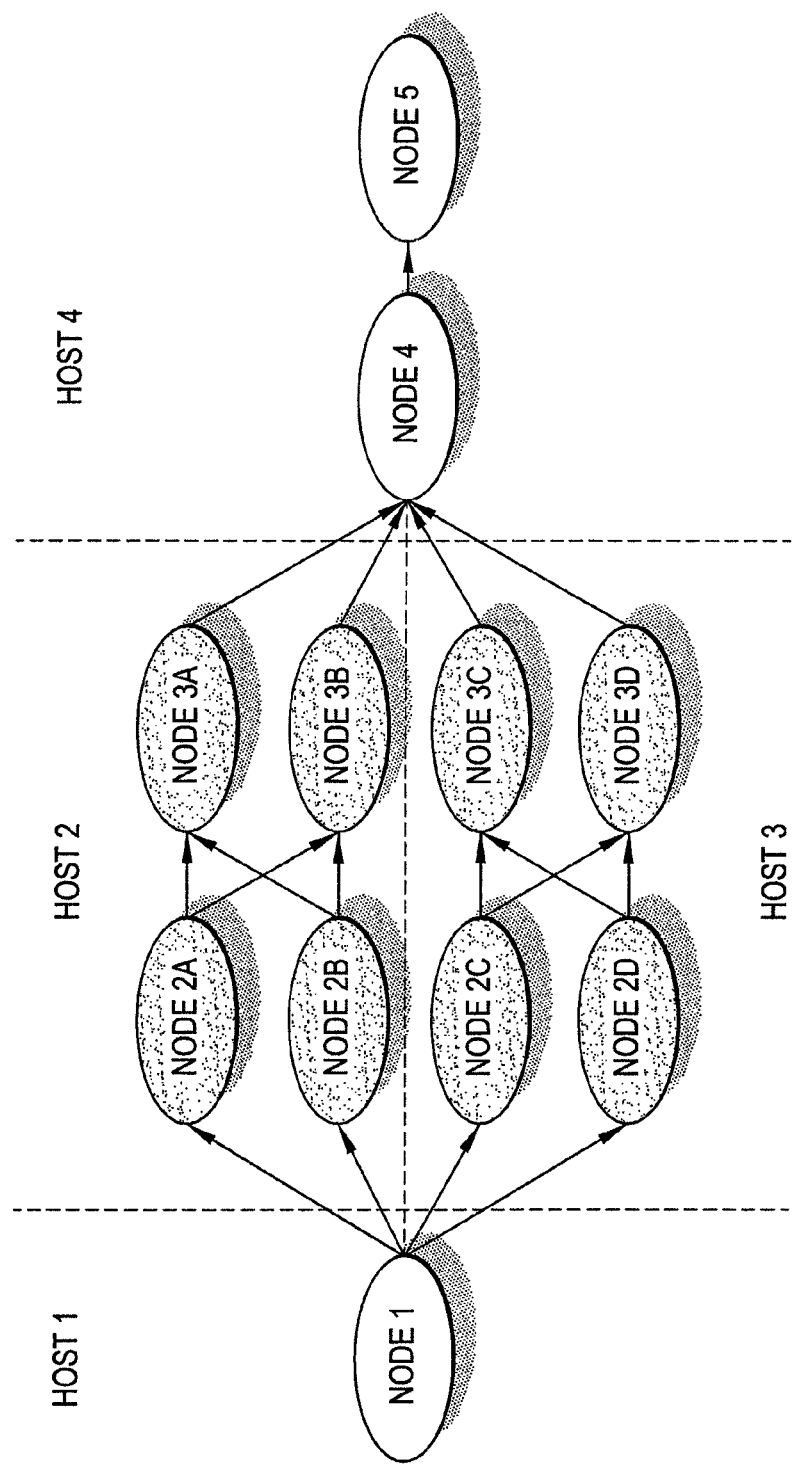
FIG. 15 presents a block diagram of another multiplying a mediation process according to an embodiment of the invention.

If the processing capacity of a single host is the bottleneck, the sharing of the workload can be done between hosts. FIG. 15 describes an embodiment, which is able to enhance processing capacity of the system in this way. In FIG. 15, nodes 2 and 3 have been multiplied into nodes 2a, 2b, 3a and 3b running in one host, and nodes 2c, 2d, 3c, 3d running in another host, all processing the event records in parallel.

Buffers are placed between the nodes to ensure the reliability of the mediation process. Reliability measures with the buffers include a certain processing order of event records within the node, outgoing buffer and incoming buffer. In a preferred embodiment, event records are stored within the buffers as groups. Number of records in each group can dynamically vary during runtime from one record to any number of records, as long as there is free storage space available. Event records are not deleted from incoming buffer before the node has processed all information relating to a record group, and has written the processed event records to outgoing buffer, thus ensuring data integrity in failure situations. In case of multiplied mediation process where one incoming buffer feeds several nodes, the first node available for process takes the first available event record group for processing. The system is provided with a locking mechanism to ensure that each event record is processed only by one of the multiplied nodes. When a node takes an event record group for processing, the node marks (locks) the event record group with "under processing" status. Hence, the other nodes know that the particular group is reserved for another node and they can take the next one form the buffer for processing. As already described above, the processing node removes the copies of the event records in a group from the incoming buffer only after processing and successfully writing the processed event records into the outgoing buffer. Thus, no data is lost in case the processing node shuts down in an uncontrolled way due to failure of the node or external system, and the lock of the input event record group is automatically released by the underlying UNIX operating system. When the node recovers, it removes any incomplete record groups in output buffer(s) and restarts processing from the start of the input record group. In case of multiple nodes reading from the same input buffer, another node will take care of processing the interrupted input record group as soon as it is unlocked.

Buffers also guarantee that in case the system or a part of it breaks down, the whole mediation process need not to be started from beginning. Instead, the process can continue from the point wherein the break down happened. The system keeps an audit trail of records read and written by each node to ascertain that no records are lost or duplicated, even if failure occurs.

The above description is only to exemplify the invention and is not intended to limit the scope of protection offered by the claims. The claims are also intended to cover the equivalents thereof and not to be construed literally.

The invention claimed is:

1. A mediation system configured to process usage data obtained from a telecommunication network and to deliver the processed usage data to an operation and business support system of a telecommunications operator, the mediation system comprising:
several host computers; and
at least one processing node in each host computer, the processing nodes being configured to form at least one processing chain of consecutive processing nodes such that each of the processing nodes does a part of the processing of the usage data in the processing chain,
at least one data buffer configured to buffer the usage data transmitted between the consecutive processing nodes in the at least one processing chain;
a node manager in each of the host computers, the node manager in each of the host computers being configured to manage each of the processing nodes within a corresponding one of the host computers, wherein the node managers are configured to start up at least one new processing node when a processing capacity of the mediation system has to be raised, the at least one new processing node configured to process usage data in parallel with one of the consecutive processing nodes in the at least one processing chain, the parallel processing nodes configured to read the usage data to be processed from a common data buffer in said at least one data buffer; and a common system database configured to store configuration information of each of the processing nodes and the node managers,
wherein at least one of the data buffers is capable of providing usage data to multiple ones of the processing nodes wherein the parts of the processing in at least one processing chain include aggregating the usage data, correlating the usage data, rating the usage data, delivering the processed usage data to the operation and business support system.

2. The mediation system of claim 1, wherein the processing nodes are configured to form at least two parallel processing chains of consecutive processing nodes.

3. The mediation system of claim 1, wherein each of the processing nodes comprises a node base providing basic functionality of a corresponding one of the processing nodes and an application containing processing rules, according to which each of the processing nodes is configured to process the usage data.

4. The mediation system of claim 3, wherein each of the node bases of the mediation system are identical to each other.

5. The mediation system of claim 1, wherein the node managers in each of the host computers are identical to each other.

6. The mediation system of claim 1, wherein,
the several host computers include a first host, a second host and a third host; and
the at least one processing chain includes a first processing chain going through the first host, the second host and the third host.

7. The mediation system of claim 1, wherein,
the several host computers include a first host, two second hosts and a third host;
the at least one processing chain includes a first processing chain going through the first host, one of the second hosts and the third host; and
the at least one processing chain includes a second processing chain going through the first host, the other one of the second hosts and the third host.

8. The mediation system of claim 6, wherein,
the first host has a first transport node configured to transfer usage data processed in the first host to the second host;
the second host has a second transport node configured to obtain usage data to be processed in the second host from the first transport node;
the second host has a third transport node configured to transfer usage data processed in the second host to the third host; and
the third host has a fourth transport node configured to obtain usage data to be processed in the third host from the third transport node.

9. The mediation system of claim 1, wherein at least one of the processing chains includes consecutive processing nodes in at least two different ones of the several host computers.

10. The mediation system of claim 9, wherein the node managers are configured to automatically initiate transport nodes in the hosts for transporting the usage data between the consecutive processing nodes in different hosts.

11. The mediation system of claim 1, wherein at least one of the processing nodes provides, as its part of the processing, a rating functionality, the rating functionality applying flexible rating criteria.

12. A mediation system configured to process usage data obtained from a telecommunication network and to deliver the processed usage data to an operation and business support system of a telecommunications operator,
the mediation system comprising:
a first and a second host computer;
a plurality of processing nodes, each of the processing nodes comprising a node base providing basic functionality of a corresponding one of the processing nodes and an application containing processing rules, according to which each of the processing nodes is configured to process the usage data, the node bases of the plurality of processing nodes being identical to each other;
at least one data buffer capable of providing usage data to multiple ones of the processing nodes; and
a node manager in the first host computer and an identical node manager in the second host computer, each of the node managers configured to manage the processing nodes within the respective host computer;
wherein the plurality of processing nodes are configured to form at least one processing chain of consecutive processing nodes such that each of the processing nodes in the processing chain does a part of the processing of the usage data,
wherein at least one of the processing nodes in the processing chain operates in the first host computer, and at least one of succeeding processing nodes in the processing chain operates in the second host computer,
wherein the at least one data buffer is configured to buffer the usage data transmitted between the consecutive processing nodes in the at least one processing chain, and
wherein the node manager is configured to start up at least one new processing node when a processing capacity of the mediation system has to be raised, the at least one new processing node configured to process usage data in parallel with one of the consecutive processing nodes in the at least one processing chain, the parallel processing nodes configured to read the usage data to be processed from a common data buffer in said at least one data buffer wherein the parts of the processing in at least one processing chain include aggregating the usage data, correlating the usage data, rating the usage data, delivering the processed usage data to the operation and business support system.

13. The mediation system of claim 12, wherein the plurality of processing nodes comprises a first layer of parallel processing nodes such that the parallel processing nodes are configured to
obtain the usage data to be processed by the nodes from a common source;
perform identical processing tasks on the usage data; and
submit the processed usage data to a common target.

14. The mediation system of claim 13, wherein the plurality of processing nodes further comprises a second layer of parallel processing nodes such that the parallel processing nodes of the second layer are configured to
obtain the usage data to be processed by the nodes from the common source, the common source being the common target of the first layer of parallel processing nodes;
perform mutually identical second processing tasks on the usage data; and
submit the processed usage data to a second common target.

15. The mediation system of claim 12, wherein the processing nodes are configured to form at least two parallel processing chains of consecutive processing nodes.

16. The mediation system of claim 12, further comprising, a third host computer; and
at least one of the processing chains including at least one of the processing nodes in each of the first, second and third host computers.

17. The mediation system of claim 12, the first host computer comprising:
a plurality of first host computers in parallel arrangement in the mediation system.

18. The mediation system of claim 12, comprising:
processing chains of consecutive processing nodes configured such that the usage data processed in a plurality of first host computers is transmitted to a single second host computer.

19. The mediation system of claim 17, comprising a plurality of second host computers in parallel arrangement in the mediation system.

20. The mediation system of claim 12, comprising processing chains of consecutive processing nodes configured such that the usage data processed in a single first host computer is transmitted to a plurality of second host computers.

21. The mediation system of claim 17, wherein each of the plurality of first host computers in parallel arrangement comprises a plurality of parallel processing nodes such that the parallel processing nodes are configured to
obtain the usage data to be processed by the nodes from a common source;
perform identical processing tasks on the usage data; and
submit the processed usage data to a common target.

22. The mediation system of claim 12, comprising a plurality of host computers, the plurality of processing nodes configured to form a matrix of processing nodes distributed in the plurality of host computers, the matrix of processing nodes comprising at least a first layer of multiplied parallel first nodes and a second layer of multiplied parallel first nodes such that the first layer of first nodes feeds the usage data to the second layer of second nodes.

23. A mediation system configured to process usage data obtained from a telecommunication network and to deliver the processed usage data to an operation and business support system of a telecommunications operator, the mediation system comprising:
several host computers;
a plurality of processing nodes running in the host computers,
each of the processing nodes having a node base providing basic functionality of a corresponding one of the processing nodes and an application containing processing rules, according to which each of the processing nodes is configured to process the usage data, the node bases of the plurality of processing nodes being identical to each other;
an identical node manager program in each of the several host computers, each of the node managers configured to manage the processing nodes within a respective one of the host computers;
at least one data buffer capable of providing usage data to multiple ones of the processing nodes; and
a common system database configured to store configuration information of each of the processing nodes and the node managers;
wherein the plurality of processing nodes are configured to form at least one processing chain of consecutive processing nodes such that each processing node in the processing chain does a part of the processing of the usage data, the processing chain comprising processing nodes operating in at least two different host computers,
wherein the at least one data buffer is configured to buffer the usage data transmitted between the consecutive processing nodes in the at least one processing chain, and
wherein the node managers are configured to start up at least one new processing node when a processing capacity of the mediation system has to be raised, the at least one new processing node configured to process usage data in parallel with one of the consecutive processing nodes in the at least one processing chain, the parallel processing nodes configured to read the usage data to processed from a common data buffer in said at least one data buffer wherein the parts of the processing in at least one processing chain include aggregating the usage data, correlating the usage data, rating the usage data, delivering the processed usage data to the operation and business support system.

* * * * *